US011014571B2

(12) United States Patent
Murashima et al.

(10) Patent No.: US 11,014,571 B2
(45) Date of Patent: May 25, 2021

(54) PHYSICAL QUANTITY MEASUREMENT DEVICE, ELECTRONIC APPARATUS, AND VEHICLE

(71) Applicant: Seiko Epson Corporation, Tokyo (JP)

(72) Inventors: Noriyuki Murashima, Chino (JP); Teppei Higuchi, Chino (JP)

(73) Assignee: Seiko Epson Corporation

( * ) Notice: Subject to any disclaimer, the term of this patent is extended or adjusted under 35 U.S.C. 154(b) by 288 days.

(21) Appl. No.: 16/174,653

(22) Filed: Oct. 30, 2018

(65) Prior Publication Data

US 2019/0126936 A1    May 2, 2019

(30) Foreign Application Priority Data

Oct. 31, 2017    (JP) .............................. JP2017-210816

(51) Int. Cl.
| | |
|---|---|
| *B60W 50/02* | (2012.01) |
| *G01C 25/00* | (2006.01) |
| *G01C 21/12* | (2006.01) |
| *G01C 19/5614* | (2012.01) |

(52) U.S. Cl.
CPC ..... *B60W 50/0205* (2013.01); *G01C 19/5614* (2013.01); *G01C 21/12* (2013.01); *G01C 25/00* (2013.01); *B60W 2050/0215* (2013.01)

(58) Field of Classification Search
None
See application file for complete search history.

(56) References Cited

U.S. PATENT DOCUMENTS

| | | | | |
|---|---|---|---|---|
| 7,267,002 B2* | 9/2007 | Itakura | ..................... | G01D 5/24 324/670 |
| 7,696,959 B2* | 4/2010 | Nitta | ........................ | G09G 3/22 345/75.2 |
| 8,680,472 B2* | 3/2014 | Mochizuki | ........ | H01L 27/14692 250/370.09 |

(Continued)

FOREIGN PATENT DOCUMENTS

| | | |
|---|---|---|
| JP | 08-327363 A | 12/1996 |
| JP | 2000-171257 A | 6/2000 |

(Continued)

*Primary Examiner* — Thomas E Worden
(74) *Attorney, Agent, or Firm* — Harness, Dickey & Pierce, P.L.C.

(57) ABSTRACT

A physical quantity measurement device includes a sensor element in which coupling capacitances are formed between a drive electrode and a first detection electrode and between the drive electrode and a second detection electrode; and a circuit device that includes a drive circuit which supplies a drive signal to the drive electrode, a detection circuit which detects physical quantity information corresponding to a physical quantity based on first and second detection signals from the first and second detection electrodes, and a failure diagnosis circuit. The circuit device includes first and second switches that are provided between first and second terminals to which the first and second detection signals are input and the detection circuit. The failure diagnosis circuit performs a failure diagnosis, based on a detection result of the detection circuit when connection states of the first and second switches are changed.

17 Claims, 14 Drawing Sheets

(56) References Cited

U.S. PATENT DOCUMENTS

| | | | |
|---|---|---|---|
| 8,919,201 B2* | 12/2014 | Koyama | G01P 15/125 |
| | | | 73/514.32 |
| 8,933,895 B2* | 1/2015 | Nakanishi | G06F 3/0412 |
| | | | 345/173 |
| 9,372,560 B2* | 6/2016 | Cho | G06F 3/04182 |
| 9,460,660 B2* | 10/2016 | Yamauchi | G09G 3/3233 |
| 9,811,219 B2* | 11/2017 | Noto | G06F 3/0446 |
| 9,983,749 B2* | 5/2018 | Saether | G06F 3/0446 |
| 10,282,017 B2* | 5/2019 | Kurasawa | G06F 3/04166 |
| 10,482,813 B2* | 11/2019 | Tsuge | G09G 3/3266 |
| 10,732,779 B2* | 8/2020 | Mugiraneza | G06F 3/0412 |
| 10,817,092 B2* | 10/2020 | Omata | G06F 3/0416 |
| 10,817,114 B2* | 10/2020 | Sasai | G06F 3/041 |
| 10,838,539 B2* | 11/2020 | Hwang | G06F 3/0446 |
| 10,884,554 B2* | 1/2021 | Katsuta | G06F 3/044 |
| 2001/0037683 A1 | 11/2001 | Nozoe et al. | |
| 2006/0164117 A1* | 7/2006 | Sander | G01R 31/2621 |
| | | | 324/762.09 |
| 2010/0011834 A1 | 1/2010 | Sato | |
| 2010/0326189 A1* | 12/2010 | Sato | G01C 19/56 |
| | | | 73/504.12 |
| 2011/0254571 A1* | 10/2011 | Togura | G06F 3/0444 |
| | | | 324/679 |
| 2012/0111111 A1 | 5/2012 | Murakami et al. | |
| 2013/0342514 A1* | 12/2013 | Yokoyama | H01L 27/14603 |
| | | | 345/204 |
| 2014/0092061 A1* | 4/2014 | Akai | G06F 3/04182 |
| | | | 345/174 |
| 2014/0176496 A1* | 6/2014 | Azumi | G06F 3/04182 |
| | | | 345/174 |
| 2014/0334521 A1* | 11/2014 | Wu | G01K 7/24 |
| | | | 374/170 |
| 2015/0091865 A1* | 4/2015 | Funayama | G06F 3/0446 |
| | | | 345/174 |
| 2015/0170611 A1* | 6/2015 | Noto | G09G 5/18 |
| | | | 345/173 |
| 2015/0205433 A1* | 7/2015 | Mizuhashi | G06F 3/0446 |
| | | | 345/174 |
| 2016/0041664 A1* | 2/2016 | Qin | G06F 3/04166 |
| | | | 345/173 |
| 2016/0075549 A1* | 3/2016 | Aoki | B81B 3/0086 |
| | | | 257/417 |
| 2016/0274181 A1* | 9/2016 | Aoyama | G01C 19/5649 |
| 2016/0282116 A1* | 9/2016 | Haneda | G01C 19/5649 |
| 2016/0334934 A1* | 11/2016 | Mo | G09G 3/3688 |
| 2017/0184645 A1* | 6/2017 | Sawataishi | G06F 3/04166 |
| 2018/0039373 A1* | 2/2018 | Katsuta | G06F 3/046 |
| 2018/0268773 A1* | 9/2018 | Imai | G09G 3/3696 |
| 2018/0275793 A1* | 9/2018 | Hamaguchi | G06F 3/0446 |
| 2019/0171314 A1* | 6/2019 | Hamaguchi | G06F 3/044 |
| 2019/0235679 A1* | 8/2019 | Zou | G09G 3/3241 |
| 2020/0293121 A1* | 9/2020 | Matsui | G06F 3/0446 |

FOREIGN PATENT DOCUMENTS

| | | |
|---|---|---|
| JP | 2010-025695 A | 2/2010 |
| JP | 2011-027455 A | 2/2011 |
| JP | 2016-170136 A | 9/2016 |

* cited by examiner

| STATE | D1(DV1)<br>SW1=OFF<br>SW2=ON | D2(DV2)<br>SW1=ON<br>SW2=OFF | D3(DV3)<br>SW1=ON<br>SW2=ON | D4(DV4)<br>SW1=OFF<br>SW2=OFF |
|---|---|---|---|---|
| NORMAL | $-(cp2/cf) \ast vds$ | $(cp1/cf) \ast vds$ | $\{(cp1-cp2)/cf\} \ast vds$ | 0 |
| WR1 IS DISCONNECTED | $-(cp2/cf) \ast vds$ | 0 | $-(cp2/cf) \ast vds$ | 0 |
| WR2 IS DISCONNECTED | 0 | $(cp1/cf) \ast vds$ | $(cp1/cf) \ast vds$ | 0 |
| WR1 AND WR2 ARE DISCONNECTED | 0 | 0 | 0 | 0 |

FIG. 6

PHYSICAL QUANTITY MEASUREMENT DEVICE, ELECTRONIC APPARATUS, AND VEHICLE

CROSS-REFERENCE

The entire disclosure of Japanese Patent Application No. 2017-210816, filed Oct. 31, 2017 is expressly incorporated by reference herein.

BACKGROUND

1. Technical Field

The present invention relates a physical quantity measurement device, an electronic apparatus, and a vehicle.

2. Related Art

In the related art, a physical quantity measurement device that detects a physical quantity based on a detection signal from a sensor element is known. In a gyro sensor as an example, the physical quantity measurement device detects an angular velocity or the like as a physical quantity. The gyro sensor is incorporated in, for example, an electronic apparatus such as a digital camera or a smartphone, and a vehicle such as a car or an airplane, and performs a camera shake correction, a posture control, a GPS autonomous navigation, and the like by using the physical quantity such as the detected angular velocity.

Techniques of related art which are disclosed in, for example, JP-A-8-327363, JP-A-2000-171257, JP-A-2010-25695, and JP-A-2011-27455 are known as a failure diagnosis method of the physical quantity measurement device. In JP-A-8-327363, a failure diagnosis is realized by detecting a mechanical coupling signal caused by mechanical coupling between a detection plate (detection element) and a drive plate (drive element) of a sensor element by using detection means. Likewise, also in JP-A-2000-171257, the failure diagnosis is realized by monitoring a self-vibration component (leakage vibration) generated by excitation of the vibrator itself. In JP-A-2010-25695, a highly accurate failure diagnosis is performed by extracting a self-vibration component and performing a temperature correction using temperature characteristic correction means. An angle sensor of JP-A-2011-27455 includes a ΣΔ modulator including first and second D/A conversion circuits, first and second integration circuits, and a comparison circuit. A failure diagnosis for detecting disconnection around any one detection electrode of first and second detection electrodes is realized by using first and second voltage sources and first and second switches which supply power supply voltages having opposite potentials to each other.

However, the methods of JP-A-8-327363, JP-A-2000-171257, and JP-A-2010-25695, and that use a vibration leakage component (self-vibration component, mechanical coupling signal) for failure diagnosis of a physical quantity measurement device are susceptible to an individual fluctuation of the sensor elements, and there is a tendency that a determination accuracy of the failure diagnosis deteriorates. In addition, since a sensor element having a less vibration leakage component in structure performs a reliable failure diagnosis, it is necessary to accurately incorporate a desirable vibration leakage component by using a trimming technique or the like. In addition, in order to electrically extract the vibration leakage component, a synchronous detection circuit for detecting the vibration leakage component is required separately from a circuit for detecting the Coriolis force, a chip size is increased, and a size reduction and cost reduction of the product are hindered. In addition, an extraction circuit for extracting the vibration leakage component is required and there is a problem that it is determined as a failure also due to a trouble of the extraction circuit. In the technique of related art in JP-A-2011-27455, first and second reference voltages for supplying a power supply voltage of reverse potential for the failure diagnosis are additionally required, and there is a problem that it is impossible to determine in which of first and second detection electrodes a disconnection around the detection electrode occurs.

SUMMARY

An advantage of some aspects of the invention is to solve at least a part of the problems described above, and the invention can be implemented as the following forms or embodiments.

A physical quantity measurement device according to an aspect of the invention includes a sensor element that includes a drive electrode, a first detection electrode, and a second detection electrode, and in which coupling capacitances are formed between the drive electrode and the first detection electrode and between the drive electrode and the second detection electrode; and a circuit device that includes a drive circuit which supplies a drive signal to the drive electrode, a detection circuit which detects physical quantity information corresponding to a physical quantity, based on a first detection signal from the first detection electrode and a second detection signal from the second detection electrode, and a failure diagnosis circuit. The circuit device includes a first switch that is provided between a first terminal to which the first detection signal is input and the detection circuit, and a second switch that is provided between a second terminal to which the second detection signal is input and the detection circuit. The failure diagnosis circuit performs a failure diagnosis based on a detection result of the detection circuit when connection states of the first and second switches are changed.

According to the aspect of the invention, coupling capacitances are formed between a drive electrode of a sensor element and a first detection electrode and between the drive electrode and a second detection electrode. Thereby, a signal component of a drive signal of a drive circuit is transmitted to first and second terminals of a circuit device via the coupling capacitance. In addition, in the circuit device, a first switch is provided between the first terminal to which a first detection signal from the sensor element is input and a detection circuit, and a second switch is provided between the second terminal to which a second detection signal from the sensor element is input and the detection circuit. At the time of a failure diagnosis, connection states of the first and second switches change. Thereby, the signal components transmitted to the first and second terminals of the circuit device via the coupling capacitances are transmitted to the detection circuit or are not transmitted, depending on whether the first and second switches are turned on or off. Accordingly, the detection result from the detection circuit changes depending on the connection states of the first and second switches, and a failure diagnosis circuit can detect by determining in which signal paths of the first and second detection signals the failure occurs, based on the change in the detection result. Accordingly, it is possible to provide a physical quantity measurement device and the like which can determine and detect a failure on the signal paths of the first and second detection signals with simple processing and configuration in which the connection states of the first and second switches are changed.

In the aspect of the invention, the connection states may include a first connection state in which the first switch is turned off and the second switch is turned on, and a second connection state in which the first switch is turned on and the second switch is turned off, and the failure diagnosis circuit may perform the failure diagnosis, based on a first failure diagnosis value which is a detection result value of the detection circuit when the first and second switches are in the first connection state, and a second failure diagnosis value which is a detection result value of the detection circuit when the first and second switches are in the second connection state.

With this configuration, in a first connection state, the first switch is turned off and the second switch is turned on, and thereby, signal components passing through coupling capacitances are not transmitted to a detection circuit in the signal path of the first detection signal and are transmitted to the detection circuit in the signal path of the second detection signal. Meanwhile, in a second connection state, the second switch is turned on and the second switch is turned off, and thereby, the signal components passing through the coupling capacitances are transmitted to the detection circuit in the signal path of the first detection signal and are not transmitted to the detection circuit in the signal path of the second detection signal. Accordingly, as a failure diagnosis circuit performs the failure diagnosis based on the detection result of the detection circuit, it is possible to determine and detect the failure in the signal paths of the first and second detection signals.

In the aspect of the invention, the connection states may include a third connection state in which the first and second switches are turned on, and the failure diagnosis circuit may perform the failure diagnosis based on the first and second failure diagnosis values and a third failure diagnosis value which is a detection result value of the detection circuit when the first and second switches are in the third connection state.

With this configuration, a failure diagnosis can be performed by using a third failure diagnosis value in addition to first and second failure diagnosis values, and thereby, it is possible to increase a determination accuracy of the failure diagnosis.

In the aspect of the invention, the failure diagnosis circuit may perform the failure diagnosis through comparison determination processing of the first, second, and third failure diagnosis values.

With this configuration, it is possible to realize an appropriate failure diagnosis through simple processing of comparing and determining first, second, and third failure diagnosis values.

In the aspect of the invention, the drive circuit may output the drive signal of a rectangular wave, and the detection circuit may include a synchronous detection circuit that performs a synchronous detection based on the drive signal.

With this configuration, by performing a drive with a drive signal of a rectangular wave and by performing a synchronous detection of a signal (electrostatic leakage signal) that can be detected via a coupling capacitance, a stable failure diagnosis can be realized and a determination accuracy can be increased, compared with a case of performing a drive with a sinusoidal drive signal. For example, a detection result of a detection circuit at a rising edge and a falling edge of the drive signal of a rectangular wave are appropriately obtained by a synchronous detection of a synchronous detection circuit, and thereby, it is possible to increase a determination accuracy of the failure diagnosis.

In the aspect of the invention, the physical quantity measurement device may further include a third switch that is provided between one end of the first switch whose the other end is connected to the first terminal and a node of an analog ground, and is turned on when the first switch is turned off; and a fourth switch that is provided between one end of the second switch whose the other end is connected to the second terminal and the node of the analog ground, and is turned on when the second switch is turned off.

With this configuration, in a case where a first switch is turned off, the third switch is turned on, and thereby, a node of a first terminal can be set to an analog ground, and in a case where a second switch is turned off, a fourth switch is turned on, and thereby, a node of a second terminal can be set to the analog ground, and thus, an appropriate failure diagnosis can be realized.

In the aspect of the invention, the detection circuit may include an amplification circuit that includes a first capacitor which is provided between a first output terminal and a first input terminal and a second capacitor which is provided between a second output terminal and a second input terminal, and performs a differential amplification of the first and second detection signals, the first switch may be provided between the first input terminal of the amplification circuit and the first terminal of the circuit device, and the second switch may be provided between the second input terminal of the amplification circuit and the second terminal of the circuit device.

With this configuration, a failure diagnosis based on a detection result of a detection circuit can be realized by using a coupling capacitance and first and second capacitors of an amplification circuit.

In the aspect of the invention, the failure diagnosis circuit may perform the failure diagnosis based on a detection result value of digital data of the detection circuit when the connection states of the first and second switches are changed.

With this configuration, it is possible to detect a failure through digital calculation processing in which a detection result value of a detection circuit is used, and to realize a failure diagnosis through simple processing.

In the aspect of the invention, the failure diagnosis circuit may perform the failure diagnosis during an oscillation activation period of the sensor element.

With this configuration, if the failure diagnosis is performed during an oscillation drive period, even if first and second switches on signal paths of first and second detection signals are turned on and off, detection processing of a detection circuit is not affected, and thereby, both appropriate failure diagnosis and detection processing can be realized.

In the aspect of the invention, the failure diagnosis circuit may perform the failure diagnosis during the oscillation activation period after a drive of the sensor element is started by the drive circuit.

With this configuration, connection states of first and second switches are changed while changing a voltage level of a drive signal of a drive circuit during an oscillation activation period, and thereby, it is possible to perform a failure diagnosis.

In the aspect of the invention, the failure diagnosis circuit may obtain index information of a floor noise that is generated in the detection circuit, based on a detection result of the detection circuit and may perform the failure diagnosis based on the index information, during a detection period of the detection circuit.

With this configuration, a failure can be appropriately detected by using index information of the floor noise. In addition, it is possible to detect a failure even during a detection period in which detection processing is performed, and to realize a failure diagnosis all the time.

An electronic apparatus according to another aspect of the invention includes the physical quantity measurement device described above.

A vehicle according to another aspect of the invention includes the physical quantity measurement device described above.

BRIEF DESCRIPTION OF THE DRAWINGS

The invention will be described with reference to the accompanying drawings, wherein like numbers reference like elements.

FIG. 6 is an explanatory diagram of the failure diagnosis method according to the present embodiment.

DESCRIPTION OF EXEMPLARY EMBODIMENTS

Hereinafter, preferred embodiments of the invention will be described in detail. The present embodiment to be described below does not unduly limit the content of the invention described in the appended claims, and all the configurations which are described in the present embodiment are not essential as means for solving the invention.

1. Physical Quantity Measurement Device

Figure 1:
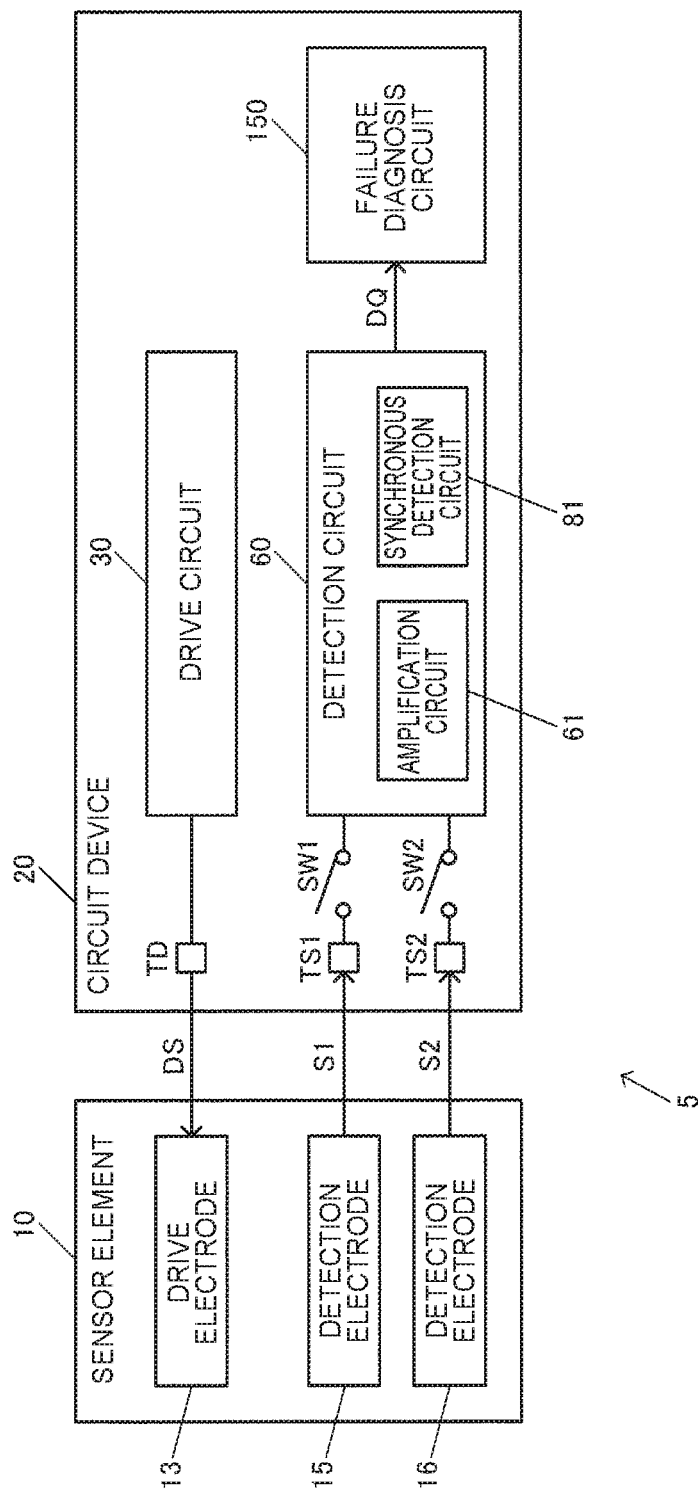
FIG. 1 is a configuration example of a physical quantity measurement device according to the present embodiment.

FIG. 1 illustrates a configuration example of a physical quantity measurement device 5 according to the present embodiment. The physical quantity measurement device 5 (physical quantity detection device, sensor device) includes a sensor element 10 and a circuit device 20. The physical quantity measurement device 5 is not limited to the configuration of FIG. 1, and various types of modifications such as omitting some of the configuration elements thereof and adding another configuration element can be made.

The sensor element 10 (physical quantity transducer, vibrator) is an element for detecting a physical quantity, for example, the sensor element 10 includes a vibrator element (vibrator), and the physical quantity is detected by using vibration of the vibrator element. For example, in a case where the sensor element 10 is a gyro sensor element, an angular velocity is detected as the physical quantity. The physical quantity detected by the sensor element 10 may be a physical quantity (for example, an acceleration, an angular acceleration, velocity, a movement distance, a pressure, or the like) other than the angular velocity.

The sensor element 10 includes a drive electrode and detection electrodes 15 and 16, and a coupling capacitance (electrostatic coupling capacitance) is formed between the drive electrode 13 and the detection electrode (first detection electrode) and between the drive electrode 13 and the detection electrode 16 (second detection electrode). For example, the coupling capacitance is formed (configured) by parasitic capacitances between the drive electrode 13 and the detection electrodes 15 and 16. The drive electrode 13 may be a drive electrode (drive conductor pattern) provided in drive arms 18A to 18D as will be described below with reference to FIG. 14 and may be a drive wire (drive wire conductor pattern) connected to the drive electrode. The detection electrodes 15 and 16 may also be detection electrodes (detection conductor patterns) provided on the detection arms 19A and 19B and may be detection wires (detection wire conductor pattern) connected to the detection electrodes. In the present embodiment, the detection electrode 15 (first detection electrode) and the detection electrode 16 (second detection electrode) are an example provided so as to output respectively a detection signal S1 (first detection signal) and a detection signal S2 (second detection signal) which are in a relationship of differential signals.

The circuit device 20 includes a drive circuit 30, a detection circuit 60, and a failure diagnosis circuit 150. The circuit device 20 includes a switch SW1 (first switch), a switch SW2 (second switch), and terminals TD, TS1, and TS2 (pads). The drive circuit 30 supplies a drive signal DS to the drive electrode 13 of the sensor element 10. For example, the drive circuit 30 supplies the drive signal DS to the sensor element 10 via the terminal TD (drive terminal). The vibrator element of the sensor element 10 vibrates by supplying the drive signal DS to the drive electrode 13. In the detection circuit 60, a detection signal S1 (first detection signal) from the detection electrode 15 of the sensor element 10 is input via the terminal TS1 (first terminal), and a detection signal S2 (second detection signal) from the detection electrode 16 is input via the terminal TS2 (second terminal). Physical quantity information (angular velocity, acceleration, and the like) corresponding to a physical quantity is detected based on the detection signals S1 and S2 from the detection electrodes 15 and 16. For example, the vibrator element of the sensor element 10 is vibrated by the drive signal DS, and thereby, the detection signals S1 and S2 which are current signals or voltage signals are output from the detection electrodes 15 and 16. The detection circuit 60 detects a desirable signal (a Coriolis force signal or the like) corresponding to a physical quantity and detects physical quantity information, based on the detection signals S1 and S2. For example, the detection circuit 60 has an amplification circuit 61 and a synchronous detection circuit 81. The amplification circuit 61 performs signal amplification (differential amplification) of the detection signals S1 and S2, and the synchronous detection circuit 81 performs a synchronous detection based on the signal amplified by the amplification circuit 61 and detects a desirable signal (desirable wave).

The circuit device 20 includes the switches SW1 and SW2. The switch SW1 (first switch) is provided between the terminal TS1 (first terminal) to which the detection signal S1 (first detection signal) is input and the detection circuit 60 (amplification circuit 61). The switch SW2 (second switch) is provided between the terminal TS2 (second terminal) to which the detection signal S2 (second detection signal) is input and the detection circuit 60 (amplification circuit 61). The switches SW1 and SW2 are turned on and off by, for example, a failure diagnosis circuit 150 (processing circuit). The detection circuit 60 may perform ON and OFF control of the switches SW1 and SW2, or the ON and OFF control of the switches SW 1 and SW 2 may be performed by a register unit 180 of FIG. 9 which will be described below. In addition, the switches SW1 and SW2 can be realized by transistors. Specifically, MOS transistors can be used as the switches SW1 and SW2. In addition, the switches SW1 and SW2 may be realized by a transfer gate.

The failure diagnosis circuit 150 (abnormality diagnosis circuit) performs a failure diagnosis (diagnosis of an abnormality state) of the physical quantity measurement device 5. The failure diagnosis circuit 150 may be a circuit realized by automatic disposition wiring such as a gate array or may be a circuit realized by a processor such as a DSP, an MPU or the like. For example, the failure diagnosis circuit 150 performs a failure diagnosis based on a detection result value DQ which is detection results of the detection circuit 60. In a case where the detection circuit 60 includes an A/D conversion circuit, the detection result value DQ is digital data that is converted from analog data to digital data by an A/D conversion circuit. The failure diagnosis circuit 150 performs a failure diagnosis, based on the detection result value DQ which is the detection result of the detection circuit 60 when connection states of the switches SW1 and SW2 are changed. By doing so, ON and OFF of the switches SW1 and SW2 are controlled, and thereby, a connection state is changed, the detection results are monitored at each connection state, and the failure diagnosis can be realized. Accordingly, it is possible to realize a failure diagnosis in which failure on the signal paths of the detection signals S1 and S2 can be determined and detected by simple configuration and processing of turning on and off the switches SW1 and SW2. In addition, it is also possible to realize both reduction of noise by reducing a capacitance value of a coupling capacitance and failure diagnosis at the same time. The connection state is a plurality of states due to each of the switches SW1 and SW2 being turned on or off. The detection result of the detection circuit 60 is a result obtained by the same detection processing as ordinary detection processing for detecting the physical quantity information. For example, in the normal detection processing, the detection result value DQ which is the detection result of the detection circuit 60 is a value representing the detected physical quantity information.

For example, the connection states of the switches SW1 and SW2 include a first connection state in which the switch SW1 is turned off and the switch SW2 is turned on, and a second connection state in which the switch SW1 is turned on and the switch SW2 is turned off. In this case, the failure diagnosis circuit 150 performs failure diagnosis, based on a first failure diagnosis value which is the detection result value DQ of the detection circuit 60 when the switches SW1 and SW2 are in the first connection state and a second failure diagnosis value which is the detection result value DQ of the detection circuit 60 when the switches SW1 and SW2 are in the second connection state. By doing so, connection states of the switches SW1 and SW2 are set to the first and second connection states, the failure diagnosis circuit 150 acquires the detection result values DQ in the first and second connection states as first and second failure diagnosis values, and thereby, it is possible to realize the failure diagnosis of the physical quantity measurement device 5. Thereby, for example, it is possible to determine and detect on which signal path of the detection signals S1 and S2 the failure occurs.

In addition, the connection states of the switches SW1 and SW2 can include a third connection state in which the switches SW1 and SW2 are turned on. In this case, the failure diagnosis circuit 150 performs the failure diagnosis, based on the first and second failure diagnosis values and a third failure diagnosis value which is the detection result value DQ of the detection circuit 60 when the switches SW1 and SW2 are in the third connection state. By doing so, the connection states of the switches SW1 and SW2 are set to the first, second, and third connection states, the failure diagnosis circuit 150 acquires the detection result value DQ in the first, second, and third connection states as first, second, third failure diagnosis values, and thereby, it is possible to realize the failure diagnosis of the physical quantity measurement device 5. Thereby, it is possible to realize determination processing such as comparing the first and second failure diagnosis values and the third failure diagnosis value and to realize determination processing of more appropriate failure diagnosis.

In addition, the failure diagnosis circuit 150 performs the failure diagnosis by performing comparison determination processing of the first, second, and third failure diagnosis values. For example, the failure diagnosis circuit performs determination processing of the failure diagnosis by performing processing such as comparing the first failure diagnosis value with the second failure diagnosis value, comparing the first failure diagnosis value with the third failure diagnosis value, or comparing the second failure diagnosis value with the third failure diagnosis value. By doing so, it is possible to realize the determination processing of the failure diagnosis by using simple calculation processing in which the first, second, and third failure diagnosis values, and achieve miniaturization of the failure diagnosis circuit 150, simplification of the determination processing, and the like.

Figure 2:
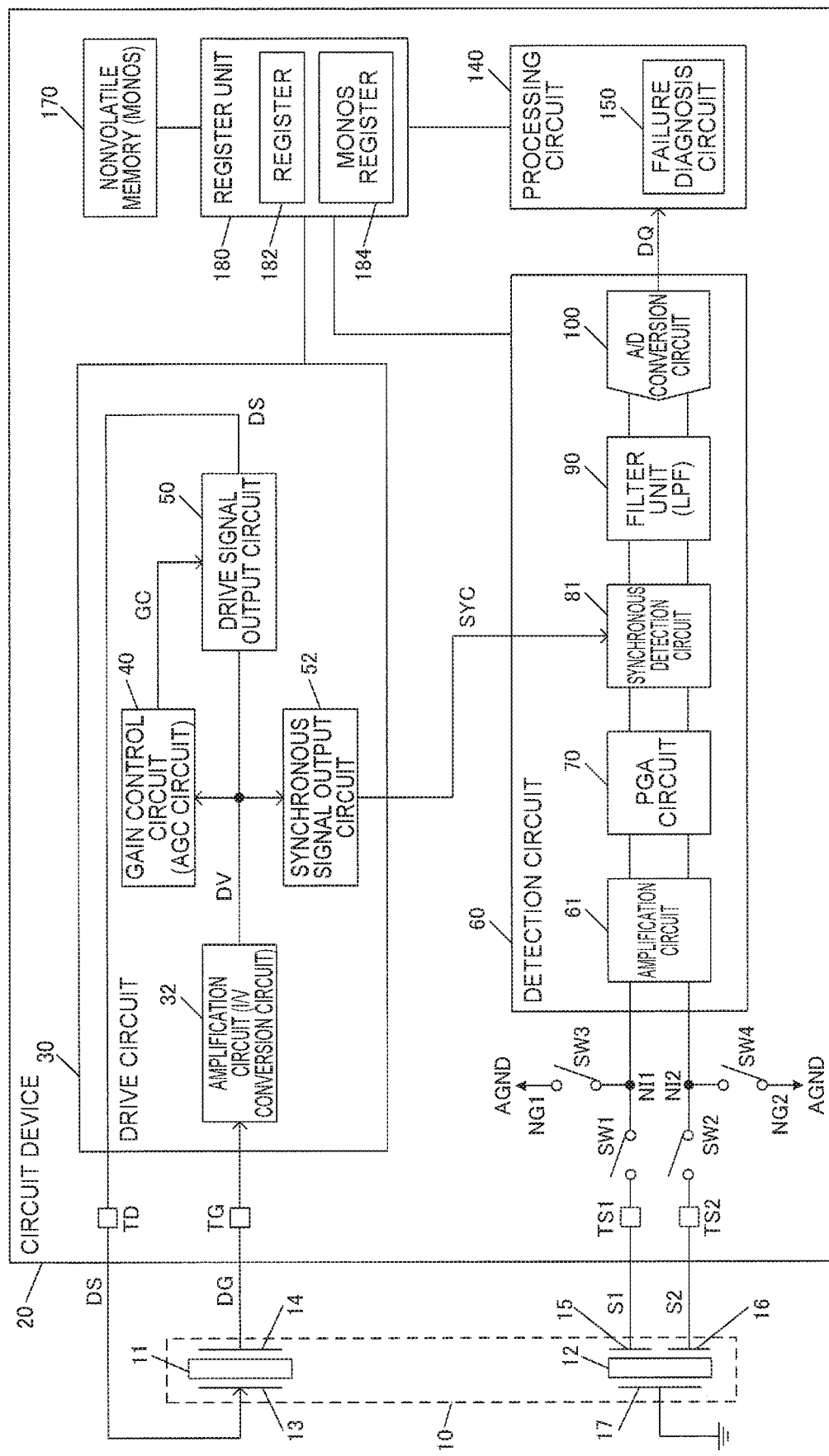
FIG. 2 is a detailed configuration example of the physical quantity measurement device.

FIG. 2 illustrates an example of a detailed configuration of the physical quantity measurement device 5 according to the present embodiment. The sensor element 10 includes vibrator elements 11 and 12, drive electrodes 13 and 14, the detection electrodes 15 and 16, and a ground electrode 17. The vibrator elements 11 and 12 are piezoelectric type vibrator elements formed from a thin plate of a piezoelectric material such as quartz crystal. Specifically, the vibrator elements 11 and 12 are formed of a Z-cut quartz crystal substrate. The piezoelectric material of the vibrator elements 11 and 12 may be a material such as ceramics or silicon other than the quartz crystal.

The drive signal DS from the drive circuit 30 is supplied to the drive electrode 13 via the terminal TD, and thereby, the drive vibrator element 11 vibrates. The vibrator element 11 is, for example, drive arms 18A to 18D of FIG. 14 which will be described below. A feedback signal DG from the drive electrode 14 is input to the drive circuit 30 via the terminal TG. For example, the feedback signal DG generated by vibration of the vibrator element 11 is input to the drive circuit 30.

The detection vibrator element 12 vibrates as the drive vibrator element 11 vibrates, and electric charges (a current) generated by the vibration is input to the detection circuit 60 from the detection electrodes 15 and as detection signals S1 and S2. Specifically, the detection signals S1 and S2 from the sensor element 10 are input to the detection circuit 60 via the terminals TS1 and TS2 and the switches SW1 and SW2. Here, the ground electrode is set to a grounded potential (GND). The detection circuit 60 detects physical quantity information (angular velocity and the like) corresponding to the detection signals S1 and S2, based on the detection signals S1 and S2.

In the following description, a case where the sensor element 10 is a gyro sensor element will be mainly described as an example, but the present embodiment is not limited to this, and the sensor element may be an element that detects other physical quantities such as acceleration. In addition, for example, a double T-shaped vibrator element illustrated in FIG. 14 which will be described below can be used as the sensor element 10, but the sensor element may be a vibrator element such as a tuning fork type vibrator element or an H-type vibrator element.

The circuit device 20 includes the drive circuit 30, switches SW1 to SW4, the detection circuit 60, a processing circuit 140, a nonvolatile memory 170, and a register unit 180. The drive circuit 30 includes an amplification circuit 32 to which the feedback signal DG from the sensor element 10 is input, a gain control circuit 40 (AGC circuit) that performs an automatic gain control, and a drive signal output circuit 50 that outputs the drive signal DS to the sensor element 10. In addition, the drive circuit 30 includes a synchronous signal output circuit 52 that outputs a synchronous signal SYC to the detection circuit 60. A configuration of the drive circuit 30 is not limited to FIG. 2 and may be modified in various ways such as omitting a part of the configuration elements or adding another configuration element.

The amplification circuit 32 (I/V conversion circuit) amplifies the feedback signal DG from the sensor element 10. For example, the amplification circuit converts a current feedback signal DG from the sensor element 10 into a voltage signal DV and outputs the voltage signal. The amplification circuit 32 can be realized by an operational amplifier, a feedback resistor, a feedback capacitor, and the like.

The drive signal output circuit 50 outputs the drive signal DS, based on the signal DV amplified by the amplification circuit 32. The gain control circuit 40 (AGC) outputs a control voltage GC to the drive signal output circuit 50 and controls an amplitude of the drive signal DS. Specifically, the gain control circuit 40 monitors the signal DV and controls a gain of an oscillation loop. For example, the drive circuit 30 needs to constantly keep an amplitude of a drive voltage supplied to the sensor element 10 (drive vibrator element 11) in order to keep sensitivity of the sensor constant. Accordingly, the gain control circuit 40 for automatically adjusting a gain is provided in an oscillation loop of a drive vibration system. The gain control circuit 40 controls the gain variably and automatically such that the amplitude (vibration speed v of the vibrator element) of the feedback signal DG from the sensor element 10 is constant. The gain control circuit 40 can be realized by a full-wave rectifier that performs a full-wave rectification of the signal DV from the amplification circuit 32, an integrator that performs integration processing of an output signal of the full-wave rectifier, and the like.

For example, in a case where the drive signal output circuit 50 outputs the drive signal DS of a rectangular wave, the drive signal output circuit 50 can be configured by a comparator, a buffer circuit, and the like. The comparator compares a voltage of the signal DV with a reference voltage (AGND). The buffer circuit buffers an output signal of the comparator and outputs the buffered signal as the drive signal DS. In this case, the buffer circuit outputs a drive signal DS at which a control voltage GC from the gain control circuit 40 has a power supply voltage level (high potential side power supply voltage). Thereby, an amplitude of the drive signal DS which is a rectangular wave signal is controlled by the control voltage GC from the gain control circuit 40. For example, if the control voltage GC increases, the amplitude of the drive signal DS which is a rectangular wave signal increases, and if the control voltage GC decreases, the amplitude of the drive signal DS decreases. As such, if rectangular wave drive is performed by the drive signal DS, the rectangular wave signal includes frequency components of a wide range, and thereby, an activation period of oscillation of the physical quantity measurement device 5 can be shortened. The drive signal output circuit 50 may output the drive signal DS of a sinusoidal wave.

The synchronous signal output circuit 52 receives the signal DV amplified by the amplification circuit 32 and outputs the synchronous signal SYC (reference signal) to the detection circuit 60. The synchronous signal output circuit 52 can be realized by a comparator that performs binarization processing of the signal DV of a sinusoidal wave (alternating current) to generate a synchronous signal SYC of a rectangular wave, a phase adjustment circuit (phase shifter) that adjusts a phase of the synchronous signal SYC, and the like.

The switch SW1 is provided between the terminal TS1 to which the detection signal S1 is input and the detection circuit 60, and the switch SW2 is provided between the terminal TS2 to which the detection signal S2 is input and the detection circuit 60. The circuit device 20 of FIG. 2 includes the switch SW3 (third switch) and the switch SW4 (fourth switch) in addition to the switches SW1 and SW2. The switches SW3 and SW4 are realized by, for example, transistors (MOS transistors).

The switch SW3 is provided between one end (NI1) of the switch SW1 whose the other end is connected to the terminal TS1 and a node NG1 of AGND (analog ground) and is turned on when the switch SW1 is turned off. The switch SW4 is provided between one end (NI2) of the switch SW2 whose the other end is connected to the terminal TS2 and a node NG2 of AGND (analog ground) and is turned on when the switch SW2 is turned off. Nodes NG1 and NG2 are set to a potential of AGND.

By providing the switch SW3, when the switch SW1 is turned off during a failure diagnosis, the switch SW3 is turned on, and thereby, the node NI1 at the other end of the switch SW1 can be set to the potential of AGND. In addition, by providing the switch SW4, when the switch SW2 is turned off during the failure diagnosis, the switch SW4 is turned on, and thereby, the node N12 at the other end of the switch SW2 can be set to the potential of AGND. Accordingly, it is possible to prevent that, when the switches SW1 and SW2 are turned off during the failure diagnosis, the nodes NI1 and N12 go to undefined potentials, and thereby, signals of the undefined potentials are input to the detection circuit 60. Thereby, it is possible to prevent a situation such as erroneous detection of the detection circuit 60 from occurring.

The detection circuit 60 includes an amplification circuit 61, a PGA circuit 70, a synchronous detection circuit 81, a filter unit 90, and an A/D conversion circuit 100. A configuration of the detection circuit 60 is not limited to the configuration illustrated in FIG. 2 and can be modified in various ways such as omitting a part of the configuration elements or adding another configuration element.

The amplification circuit 61 receives the detection signal S1 and the detection signal S2 from the sensor element 10 and performs electric charge-voltage conversion and signal amplification. The detection signals S1 and S2 configure differential signals. The amplification circuit 61 is configured by, for example, a Q/V conversion circuit (electric charge/voltage conversion circuit) and the like. The Q/V conversion circuit can be configured with, for example, an operational amplifier and a passive element for feedback such as a resistor or a capacitor provided between an output terminal and an input terminal of the operational amplifier. A specific configuration of the amplification circuit 61 will be described below.

The PGA circuit 70 is a so-called programmable gain amplifier and adjusts a gain of a signal amplified by the amplification circuit 61. For example, the PGA circuit adjusts gains of differential input signals from the amplification circuit 61 and outputs differential output signals.

The synchronous detection circuit 81 receives the output signals of the PGA circuit 70 and performs a synchronous detection using the synchronous signal SYC from the drive circuit 30. For example, the synchronous detection circuit performs the synchronous detection for extracting a desirable signal from the detection signals S1 and S2. For example, the synchronous detection circuit 81 performs the synchronous detection for the differential input signals from the PGA circuit 70 and outputs differential output signals obtained by performing the synchronous detection. The synchronous detection circuit 81 can be realized by, for example, a switching mixer and the like. The switching mixer performs a differential synchronous detection, based on the synchronous signal SYC, and is configured with a plurality of switches. By the synchronous detection performed by the synchronous detection circuit 81, an unnecessary signal such as noise (1/f noise) generated by the circuits in the previous stage (the amplification circuit 61 and the PGA circuit 70) are frequency-converted into a high frequency band. In addition, a desirable signal which is a signal corresponding to the Coriolis force is dropped into a DC signal.

The filter unit 90 performs low-pass filter processing (LPF) for the output signal of the synchronous detection circuit 81. For example, the filter unit 90 performs filter processing on the differential input signals from the synchronous detection circuit 81 and outputs differential output signals. The filter unit 90 removes an unnecessary signal such as 1/f noise which is frequency-converted into a high frequency band by, for example, the synchronous detection circuit 81. The filter unit 90 is, for example, a passive filter configured with a passive element. That is, as the passive filter configured with passive elements such as a resistor and a capacitor can be adopted as the filter unit 90, without using an operational amplifier.

The A/D conversion circuit 100 performs an A/D conversion of the output signal of the filter unit 90 and outputs the detection result value DQ which is digital data. The A/D conversion circuit 100 performs the A/D conversion of the differential input signals from the filter unit 90 and outputs the detection result value DQ which is the A/D conversion result to the processing circuit 140 in the rear stage. For example, the A/D conversion circuit 100 performs the A/D conversion by sampling the differential input signals from the filter unit 90 by using the filter unit 90 as a filter (prefilter) for anti-aliasing. It is possible to adopt various types of A/D conversion circuits such as a Δ-sigma type and a successive approximation type as the A/D conversion circuit 100.

According to the configuration of the detection circuit 60 illustrated in FIG. 2, the 1/f noise and the like generated by the amplification circuit 61 and the PGA circuit 70 are removed by the frequency conversion in the synchronous detection circuit 81 (switching mixer) and the low-pass filter characteristics of the filter unit 90. The synchronous detection circuit 81 configured with a switching mixer in which a gain cannot be obtained but the 1/f noise is generated, and a filter unit 90 configured with a low noise passive element are provided between the PGA circuit 70 and the A/D conversion circuit 100. Accordingly, the noise generated by the amplification circuit 61 and the PGA circuit 70 is removed and the noise generated by the synchronous detection circuit 81 and the filter unit 90 is also minimized. Since the differential input signals in a low noise state are input to the A/D conversion circuit 100 and the A/D conversion for the signals can be performed, an S/N ratio can be greatly improved. The configuration of the detection circuit 60 is not limited to the configuration illustrated in FIG. 2, and various modifications can be made. For example, the amplification circuit 61 may output a single ended signal, or an analog circuit such as the PGA circuit 70 or the synchronous detection circuit 81 may perform analog circuit processing of the single ended signal.

The processing circuit 140 (DSP) performs various types of digital signal processing. For example, the processing circuit 140 performs digital filter processing of band limitation corresponding to an application of a desirable signal and performs digital filter processing of removing noise generated by the A/D conversion circuit 100. In addition, the processing circuit performs digital correction processing such as a gain correction (sensitivity adjustment) and an offset correction. The processing circuit 140 may be realized by an automatic disposition wiring such as a gate array or may be realized by a processor such as a DSP or an MPU. The failure diagnosis circuit 150 is provided in the processing circuit 140 in FIG. 2. For example, the processing circuit 140 performs the failure diagnosis processing according to the present embodiment.

The nonvolatile memory 170 stores various types of information of the circuit device 20. For example, the nonvolatile memory 170 stores circuit operation setting information and circuit constant information. The nonvolatile memory 170 can be realized by, for example, a metal-oxide-nitride-oxide-silicon (MONOS) and the like. The register unit 180 includes a register 182 and a MONOS register 184 (a register for nonvolatile memory). The register 182 is a normal register and sets various types of information (data and commands). The MONOS register 184 stores information which is stored in the nonvolatile memory 170 and is transferred when the circuit device 20 is activated.

2. Failure Diagnosis Method

Next, the failure diagnosis method according to the present embodiment will be described in detail. In JP-A-8-327363, JP-A-2000-171257, and JP-A-2010-25695 described above, a failure diagnosis is performed by using a vibration leakage component which is also referred to as a self-vibration component. The vibration leakage component is an unnecessary component which is generated due to a structure of the sensor element 10 and is unnecessary when a physical quantity such as an angular velocity is detected.

Figure 14:
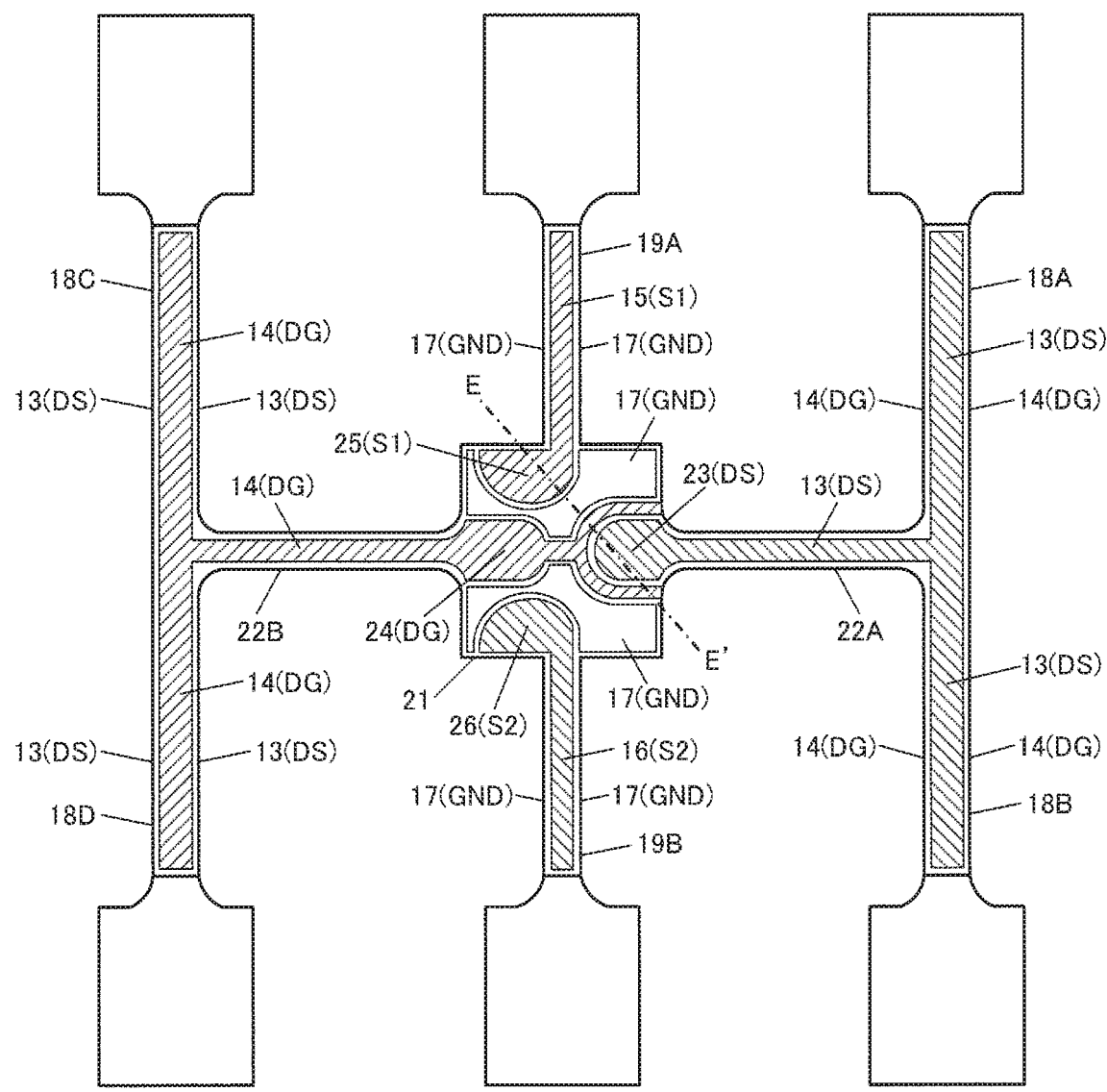
FIG. 14 is a configuration example of a sensor element.

The sensor element 10 having a double T-shaped structure as illustrated in FIG. 14 to be described below has a structure in which the drive arms 18A to 18D and the detection arms 19A and 19B are separated from each other, and thereby, unnecessary vibrations of the detection arms 19A and 19B hardly occur. In addition, since the sensor element 10 having the double T-shaped structure has a shape in which drive systems are disposed in a rotational symmetry, it is possible to offset slight vibrations that leak from the respective drive systems. Accordingly, the unnecessary vibration due to the vibration leakage component hardly occurs, an S/N ratio is excellent, and the noise component is reduced, in the structure, and the structure has characteristics in which the Coriolis force can be detected with high sensitivity. Accordingly, the vibration leakage component is reduced, and thereby, the method which uses the vibration leakage component has a problem that a proper failure diagnosis cannot be realized.

In addition, a failure diagnosis circuit in the related art which performs the failure diagnosis using the vibration leakage component is required to have a synchronous detection circuit that detects the vibration leakage component in addition to a synchronous detection circuit that detects a desirable signal (Coriolis force). Accordingly, there is a problem that a chip size increases to hinder miniaturization and cost reduction of products.

Figure 3:
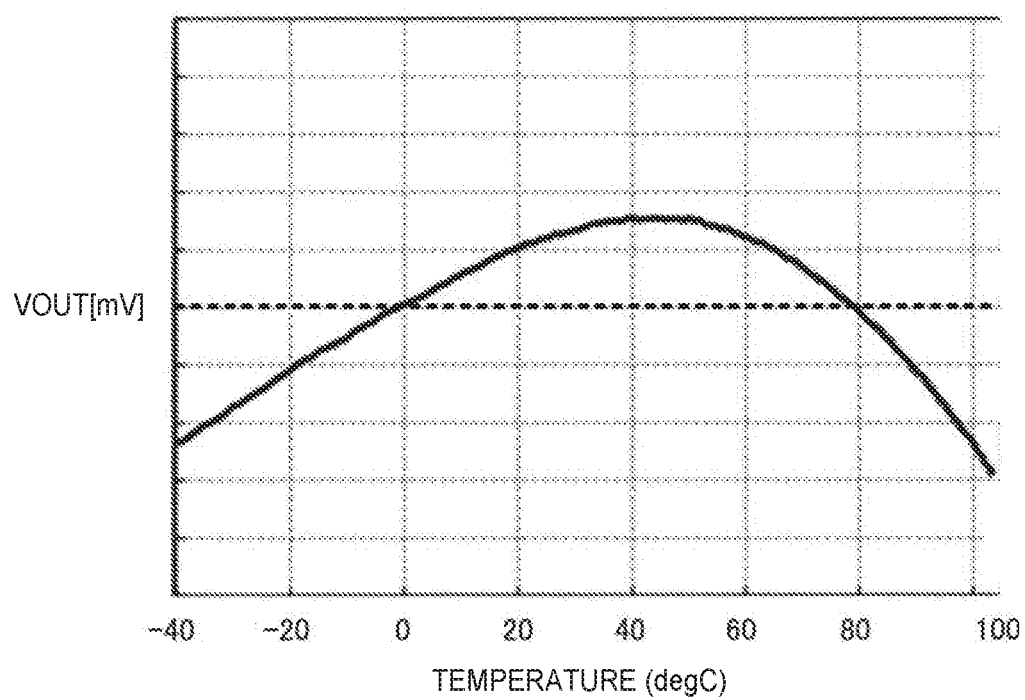
FIG. 3 illustrates an example of temperature characteristics of a sensor output voltage.

In addition, if the detection signals S1 and S2 include the vibration leakage components more than or equal to a predetermined amount, a sensor output voltage (VOUT) changes depending on a temperature as illustrated in FIG. 3. That is, if the vibration leakage component is increased so as to increase a determination accuracy of the failure diagnosis, temperature variation characteristics of the sensor output voltage deteriorate as illustrated in FIG. 3. A dashed line in FIG. 3 represents the temperature variation characteristics when the vibration leakage component is zero.

Figure 4:
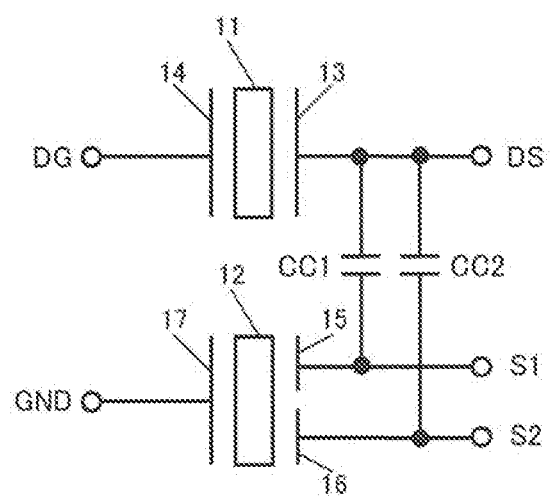
FIG. 4 is an explanatory diagram of a coupling capacitance formed between a drive electrode and a detection electrode.

Therefore, in the present embodiment, a method of performing a failure diagnosis using a coupling capacitance (electrostatic coupling capacitance) of the drive electrode 13 and the detection electrodes 15 and 16 is employed. For example, as illustrated in FIG. 4, a coupling capacitance CC1 is formed between the drive electrode 13 to which the drive signal DS is supplied and the detection electrode 15 from which the detection signal S1 is output, and a coupling capacitance CC2 is formed between the drive electrode 13 and the detection electrode 16 from which the detection signal S2 is output. In an example of FIG. 14 which will be described below, CC1 is a coupling capacitance (electrostatic coupling capacitance) formed between the drive terminal 23 of the drive electrode 13 and the detection terminal 25 of the detection electrode 15. CC2 is a coupling capacitance (electrostatic coupling capacitance) formed between the drive terminal 23 of the drive electrode 13 and the detection terminal 26 of the detection electrode 16. As such, the coupling capacitances CC1 and CC2 are formed due to a physical structure of the electrodes, and electrostatic leakage components due to the coupling capacitances appear as the detection signals S1 and S2.

That is, the physical quantity measurement device 5 according to the present embodiment includes the drive electrode 13 and the detection electrodes 15 and 16 as illustrated in FIG. 1 and FIG. 2 and includes the sensor element 10 in which the coupling capacitances CC1 and CC2 are formed between the drive electrode 13 and the detection electrode 15 and between the drive electrode 13 and the detection electrode 16, respectively, and the circuit device 20. The circuit device 20 includes the drive circuit 30 that supplies the drive signal DS to the drive electrode 13, the detection circuit 60 that detects physical quantity information corresponding to a physical quantity, based on the detection signal S1 from the detection electrode 15 and the detection signal S2 from the detection electrode 16, and the failure diagnosis circuit 150.

The circuit device 20 further includes the switch SW1 provided between the terminal TS1 to which the detection signal S1 is input and the detection circuit 60, and the switch SW2 provided between the terminal TS2 to which the detection signal S2 is input and the detection circuit 60. The failure diagnosis circuit 150 performs a failure diagnosis, based on the detection result of the detection circuit 60 when connection states of the switches SW1 and SW2 are changed.

Figure 5:
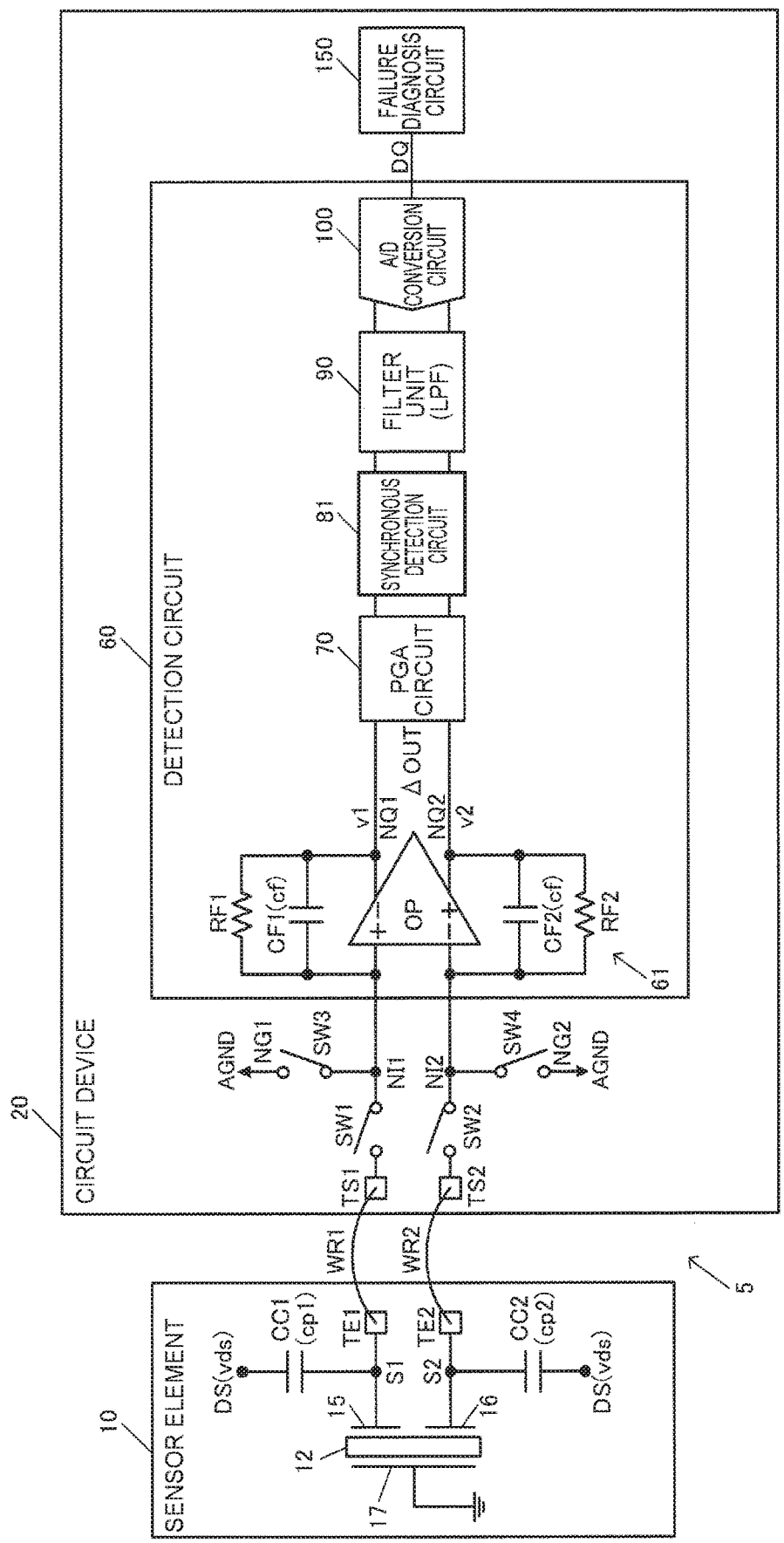
FIG. 5 is an explanatory diagram of a failure diagnosis method according to the present embodiment.

FIG. 5 is an explanatory diagram of the failure diagnosis method according to the present embodiment. As illustrated in FIG. 5, a terminal TE1 for the detection electrode 15 of the sensor element 10 is connected to the terminal TS1 of the circuit device 20 by a wire WR1 (metal wire). A terminal TE2 for the detection electrode 16 is connected to the terminal TS2 of the circuit device 20 by a wire WR2 (metal wire). Accordingly, the detection signal S1 from the detection electrode 15 is input to the circuit device 20 via the terminal TE1, the wire WR1, and the terminal TS1. The detection signal S2 from the detection electrode 16 is input to the circuit device 20 via the terminal TE2, the wire WR2, and the terminal TS2.

The detection circuit 60 includes the amplification circuit 61. The amplification circuit 61 includes a capacitor CF1 (first capacitor) provided between a first output terminal (inverting output terminal) and a first input terminal (non-inverting input terminal), and a capacitor CF2 (second capacitor) provided between a second output terminal (non-inverting output terminal) and a second input terminal (inverting input terminal). The amplification circuit performs a differential amplification of the detection signals S1 and S2. In addition, the amplification circuit 61 can include a resistor RF1 (first resistor) provided between the first output terminal (−) and the first input terminal (+), and a resistor RF2 (second resistor) provided between the second output terminal (+) and the second input terminal (−). The amplification circuit 61 performs a Q/V conversion (electric charge/voltage conversion), and the Q/V conversions of the detection signals S1 and S2 are realized by the feedback capacitors CF1 and CF2 and the resistors RF1 and RF2.

The switch SW1 is provided between the first input terminal (+) of the amplification circuit 61 and the terminal TS1. The switch SW2 is provided between the second input terminal (−) of the amplification circuit 61 and the terminal TS2. In addition, the switch SW3 is provided between the node NI1 at the other end of the switch SW1 and the node NG1 of AGND, and the switch SW4 is provided between the node NI2 at the other end of the switch SW2 and the node NG2 of AGND.

In addition, as described with reference to FIGS. 2 and 4, the coupling capacitance CC1 is formed between the drive electrode 14 and the detection electrode 15, and the coupling capacitance CC2 is formed between the drive electrode 14 and the detection electrode 16.

Here, a voltage (a voltage difference between a voltage level on a high potential side and a voltage level on a low potential side) of the drive signal DS is referred to as vds, and capacitance values of the coupling capacitances CC1 and CC2 are referred to as cp1 and cp2, and capacitance values of the capacitors CF1 and CF2 are referred to as cf. In addition, voltages at the first and second output terminals of the amplification circuit 61 are referred to as v1 and v2, and a voltage difference between the voltages v1 and v2 is referred to as $\Delta$OUT. The first and second input terminals of the operational amplifier OP are virtually grounded (AGND). Accordingly, in a case where the switches SW1 and SW2 are turned on, the following Equation (1) and Equation (2) are satisfied.

$$cp1 \times vds = cf \times v1 \quad (1)$$

$$cp2 \times vds = cf \times v2 \quad (2)$$

The above-described Equation (1) represents that the voltage v1 is a voltage obtained by amplifying the voltage vds of the drive signal DS by using a gain set by a ratio of cp1 and cf. The above-described Equation (2) represents that the voltage v2 is a voltage obtained by amplifying the voltage vds of the drive signal DS by using a gain set by a ratio of cp2 and cf. From Equations (1) and Equation (2), in a case where the switches SW1 and SW2 are turned on, the voltage difference $\Delta$OUT=v1−v2 is represented by the following Equation (3).

$$\Delta OUT = v1 - v2 = \{(cp1 - cp2)/cf\} \times vds \quad (3)$$

Meanwhile, in a case where the switch SW1 is turned off and the switch SW2 is turned on, $\Delta$OUT=v1−v2 is represented by the following Equation (4), and in a case where the switch SW1 is turned on and the switch SW2 is turned off, $\Delta$OUT=v1−v2 is represented by the following Equation (5).

$$\Delta OUT = -(cp2/cf) \times vds \quad (4)$$

$$\Delta OUT = (cp1/cf) \times vds \quad (5)$$

In a case where the switch SW1 is turned off, the switch SW3 is turned on and the node NI1 is set to AGND, and if the switch SW2 is turned off, the switch SW4 is turned on and the node NI2 is set to AGND.

FIG. 6 is a diagram illustrating the failure diagnosis method according to the present embodiment. In FIG. 6, D1 indicates a connection state in a case where the switch SW1 is turned off and the switch SW2 is turned on, D2 indicates a connection state in a case where the switch SW1 is turned on and the switch SW2 is turned off, D3 indicates a connection state in a case where both the switches SW1 and SW2 are turned on, and D4 indicates a connection state in a case where both the switches SW1 and SW2 are turned off.

As illustrated in FIG. 6, in a case where the wires WR1 and WR2 are normal without being disconnected, $\Delta$OUT=−(cp2/cf)×vds from Equation (4) is satisfied in a connection state (first connection state) of D1, and $\Delta$OUT=(cp1/cf)×vds from Equation (5) is satisfied in a connection state (second connection state) of D2. In addition, $\Delta$OUT={(cp1−cp2)/cf}×vds from Equation (3) is satisfied in a connection state (third connection state) of D3, and $\Delta$OUT=0 is satisfied in a connection state (fourth connection state) of D4.

Meanwhile, in a case where the wire WR1 is disconnected, $\Delta$OUT=−(cp2/cf)×vds is satisfied in the connection states D1 and D3, and $\Delta$OUT=0 is satisfied in the connection states D2 and D4. In addition, in a case where the wire WR2 is disconnected, $\Delta$OUT=(cp1/cf)×vds is satisfied in the connection states D2 and D3, and $\Delta$OUT=0 is satisfied in the connection states D1 and D4. In addition, in a case where both the wires WR1 and WR2 are disconnected, $\Delta$OUT=0 is satisfied in the connection states D1, D2, D3, and D4.

Here, the detection result value DQ input from the detection circuit 60 to the failure diagnosis circuit 150 corresponds to the voltage difference $\Delta$OUT=V1−V2 of the output voltage of the amplification circuit 61. As illustrated in FIG. 6, the voltage difference $\Delta$OUT changes depending on the connection states D1, D2, D3, and D4 of the switches SW1 and SW2, and thereby, the detection result value DQ input to the failure diagnosis circuit 150 also changes. In addition, in a case where the wires WR1 and WR2 are normal without being disconnected and in a case where at least one of the wires WR1 and WR2 is disconnected, the voltage difference $\Delta$OUT is also changed and the detection result value DQ is also changed.

Therefore, in the present embodiment, the failure diagnosis circuit 150 detects a failure of a wire or the like by using the detection result value DQ of the detection circuit 60 when the connection states of the switches SW1 and SW2 are changed as indicated by, for example, D1, D2, D3, and D4. By doing so, not only detection results in each connection state can be monitored but also a failure diagnosis can be realized by controlling ON and OFF of the switches SW1 and SW2 to change the connection state like D1, D2, D3, and D4, and thereby, it is possible to realize an appropriate failure diagnosis with a configuration of a small-scale circuit.

For example, the method, which uses a vibration leakage component (self-vibration component, mechanical leakage signal), in the related art has a problem that another signal input is required and an extraction circuit for extracting the vibration leakage component is required. In contrast to this, the present embodiment has an advantage in which the failure diagnosis can be realized by simple processing and configuration of changing the connection states of the switches SW1 and SW2 and thereby another signal input or extraction circuit can be unnecessary. In addition, according to the present embodiment, by changing the connection states of the switches SW1 and SW2 in various ways as illustrated in FIG. 6, a failure in a signal path of the detection signal S1 and a failure in a signal path of the detection signal S2 can be separately determined. In addition, according to the present embodiment, even if the capacitance values cp1 and cp2 of the coupling capacitances CC1 and CC2 are reduced, the failure detection can be performed, and thereby, there is an advantage that not only noise is reduced by reducing the capacitance values cp1 and cp2 but also an appropriate failure diagnosis can be realized.

The failure that becomes a target of the failure diagnosis according to the present embodiment includes not only the disconnections of the wires WR1 and WR2 but also various abnormalities in the signal paths of the detection signals S1 and S2. For example, the disconnection may be a disconnection of the wires (signal lines) in the inside of the sensor element 10 and the circuit device 20. Alternatively, the disconnection also includes a case where the wire is almost broken without being completely disconnected. That is, the failure that becomes the target of the failure diagnosis according to the present embodiment is a certain abnormality in the signal paths of the detection signals S1 and S2 such as disconnection of the wires WR1 and WR2.

As illustrated in FIG. 6, the connection state at the time of the failure diagnosis according to the present embodiment includes the connection state D1 (first connection state) in which the switch SW1 is turned off and the switch SW2 is turned on, and the connection state D2 (second connection state) in which the switch SW1 is turned on and the switch SW2 is turned off. In this case, the failure diagnosis circuit 150 performs the failure diagnosis, based on a failure diagnosis value DV1 (first failure diagnosis value) when the switches SW1 and SW 2 are in the connection state D1 and a failure diagnosis value DV2 (second failure diagnosis value) when the switches SW1 and SW 2 are in the connection state D2. In addition, the connection state at the time of failure diagnosis according to the present embodiment may include the connection state D3 (third connection state) in which both the switches SW1 and SW2 are turned on. In this case, the failure diagnosis circuit 150 performs the failure diagnosis, based on the failure diagnosis values DV1 and DV2 and the failure diagnosis value DV3 (third failure diagnosis value) when the switches SW1 and SW2 are in the connection state D3. In addition, the connection state may include the connection state D4 (fourth connection state) in which both the switches SW1 and SW2 are turned off, and the failure diagnosis circuit 150 may perform the failure diagnosis, based on the first, second, and third failure diagnosis values DV1, DV2, and DV3, and a failure diagnosis value DV4 (fourth failure diagnosis value) when the switches SW1 and SW2 are in the connection state D4.

For example, in a case where the wires WR1 and WR2 are in a normal state without being disconnected or the like, the failure diagnosis values DV1, DV2, DV3 and DV4 in the connection states D1, D2, D3, and D4 become the detection result values DQ corresponding to $\Delta OUT=(cp2/cf) \times vds$, $\Delta OUT=(cp1/cf) \times vds$, $\Delta OUT=\{(cp1-cp2)/cf\} \times vds$, $\Delta OUT=0$ of FIG. 6. In order to simplify the following description, the detection result value will be described as $DQ=\Delta OUT$. That is, the failure diagnosis values in the normal state will be described as $DV1=-(cp2/cf) \times vds$, $DV2=(cp1/cf) \times vds$, $DV3=\{(cp1-cp2)/cf\} \times Vds$, and $DV4=0$.

Meanwhile, in a case where the wire WR1 is disconnected (or in a case where the detection signal S1 is abnormal. Hereinafter, the same is applied), $DV1=-(cp2/cf) \times vds$ is satisfied, but $DV2=0$ is satisfied. In addition, in a case where the wire WR2 is disconnected (or in a case where the detection signal S2 is abnormal. Hereinafter, the same is applied), $DV2=(cp1/cf) \times vds$ is satisfied, but $DV1=0$ is satisfied. In addition, in a case where both the wires WR1 and WR2 are disconnected, $DV1=0$ and $DV2=0$ is satisfied. Accordingly, it is possible to detect a failure of a disconnection or the like of the wires WR1 and WR2, based on the detection results of the detection circuit 60 when the connection states of the switches SW1 and SW2 are changed into D1, D2, and the like. Thus, it is possible to realize an appropriate failure detection by simple configuration and processing of changing the connection states of the switches SW1 and SW2 into D1, D2, and the like.

In addition, the failure can be appropriately detected by using the detection results of the detection circuit 60 in the connection state D3. For example, as illustrated in FIG. 6, in a case of the normal state, $DV3=\{(cp1-cp2)/cf\} \times vds$ is satisfied, but in a case where the wire WR1 is disconnected, $DV3=-(cp2/cf) \times vds$ is satisfied, and in a case where the wire WR2 is disconnected, $DV3=(cp1/cf) \times Vds$ is satisfied. In addition, in a case where both the wires WR1 and WR2 are disconnected, $DV3=0$ is satisfied. Accordingly, the failure can be detected by using the three failure diagnosis values DV1, DV2, and DV3, and the failure can be detected more appropriately than a case where the failure is detected by using the failure diagnosis values DV1 and DV2. For example, only if the connection states D1 and D2 are changed, the failure can be detected by comparison determination processing or the like in which the two failure diagnosis values DV1 and DV2 are used, but, as the connection state are changed into D1, D2, and D3, the failure can be detected by the comparison determination processing or the like in which the three failure diagnosis values DV1, DV2, and DV3 are used, and thereby, accuracy of the failure detection is increased. The detection results of the detection circuit 60 in the connection state D4 may be used. That is, in addition to the failure diagnosis values DV1, DV2, and DV3, the failure is detected by using the failure diagnosis value DV4.

In the present embodiment, the failure diagnosis circuit 150 performs the failure diagnosis through the comparison determination processing of the failure diagnosis values DV1, DV2, and DV3. For example, the failure is detected through the comparison determination processing of DV1 and DV2, the comparison determination processing of DV1 and DV3, the comparison determination processing of DV2 and DV3, and the like. For example, the capacitance values cf of the capacitors CF1 and CF2 of the amplification circuit 61 are determined by a circuit design, and have fluctuations due to manufacturing process variation and environmental variation. In addition, the capacitance values cp1 and cp2 of the coupling capacitances CC1 and CC2 are not determined by the circuit design, and have large fluctuations. Accordingly, a deviation occurs between a failure diagnosis value detected at the time of failure diagnosis and an expected value of the failure diagnosis value illustrated in FIG. 6. In this regard, if the failure diagnosis is performed by the comparison determination processing of the failure diagnosis values DV1, DV2, and DV3, the failure can be detected through by relative comparison determination processing of the failure diagnosis values DV1, DV2, and DV3. Accordingly, even in a case where the deviation occurs as described above, it is possible to appropriately detect the failure.

According to the present embodiment, when the failure diagnosis is performed, in a case where the switch SW1 is turned off, the switch SW3 is turned on, and thereby, the node NI1 is set to AGND. In a case where the switch SW2 is turned off, the switch SW4 is turned on, and thereby, the node NI2 is set to AGND. Accordingly, it is possible to prevent a situation from occurring in which, when the connection states of the switches SW1 and SW2 are changed, the nodes NI1 and N12 go to undefined potentials and thereby it is impossible to obtain an appropriate failure diagnosis value. For example, in a case where the switches SW1 and SW2 are off, the nodes NI1 and N12 are set to AGND, and thereby, it is possible to appropriately realize the failure detection by using the failure diagnosis value illustrated in FIG. 6.

According to the present embodiment, the switch SW1 is provided between the first input terminal of the amplification circuit 61 including the capacitor CF1 between the first input terminal and the first output terminal, and the terminal TS1. The switch SW2 is provided between the second input terminal of the amplification circuit 61 including the capacitor CF2 between the second input terminal and the second output terminal, and the terminal TS2. Accordingly, as the connection states of the switches SW1 and SW2 are changed at the time of failure diagnosis, as illustrated in FIG. 6, the detection result values DQ based on the capacitance values cp1 and cp2 of the coupling capacitances CC1 and CC2 and the capacitance value cf of the capacitors CF1 and CF2 can be input to the failure diagnosis circuit 150 as a failure diagnosis value. Thus, the failure diagnosis circuit 150 can appropriately detect the failure through the calculation processing in which the failure diagnosis value is used based on the capacitance values cp1 and cp2 and the capacitance value cf.

In addition, in the present embodiment, the failure diagnosis circuit 150 performs the failure diagnosis, based on the detection result value DQ of the digital data of the detection circuit 60 when the connection states of the switches SW1 and SW2 are changed. By doing so, it is possible to detect the failure through digital calculation processing in which the failure diagnosis values DV1 to DV4 which are detection result value DQ are used as illustrated in FIG. 6, and to realize the failure diagnosis with simple processing and configuration.

For example, the failure diagnosis circuit 150 can perform the failure diagnosis through the calculation processing which will be described below.

For example, in a case of $|DV1|\approx|DV2|>|DV3|>|DV4|$, it is determined that no failure occurs. Here, $|X|$ is an absolute value of X. Here, the capacitance values cp1 and cp2 of the coupling capacitances CC1 and CC2 are assumed to be substantially equal (cp1≈cp2). For example, as illustrated in FIG. 6, in a case of a normal state without failure, $|(cp1/cf)\times vds|\approx|-(cp2/cf)\times vds|$, and $|DV1|\approx|DV2|$ are satisfied. In addition, because of cp1≈cp2, cp1−cp2 becomes a very small value, and $|DV1|\approx|DV2|>|DV3|=|\{(cp1-cp2)/cf\}\times vds|$ is satisfied. Because of DV4=0, $|DV3|>|DV4|=0$ is satisfied.

In addition, in a case of $|DV1|=|DV3|>|DV2|=|DV4|$, it is determined that a failure (abnormality) occurs in a signal path of the detection signal S1, for example, the wire WR1 is disconnected. For example, as illustrated in FIG. 6, in a case where the wire WR1 is disconnected, DV1 and DV3 are represented as $-(cp2/cf)\times vds$, and thereby, if the failure occurs in the path of the detection signal S1, $|DV1|\approx|DV3|$ is satisfied. In addition, because of DV2=DV4=0, $|DV1|\approx|DV3|>|DV2|=|DV4|$ is satisfied.

In addition, in a case of $|DV2|\approx|DV3|>|DV1|=|DV4|$, it is determined that the failure occurs in a signal path of the detection signal S2, for example, the wire WR2 is disconnected. For example, as illustrated in FIG. 6, in a case where the wire WR2 is disconnected, DV2 and DV3 are represented as $(cp1/cf)\times vds$, and thereby, if the failure occurs in the path of the detection signal S2, $|DV2|\approx|DV3|>|DV1|=|DV4|$ is satisfied. In addition, because of DV1=DV4=0, $|DV2|\approx|DV3|>|DV1|=|DV4|$ is satisfied.

In addition, in a case of $|DV1|=|DV2|=|DV3|=|DV4|$, the disconnection failure occurs in both the wires WR1 and WR2, it is determined that the failure occurs in both the signal paths of the detection signals S1 and S2. For example, as illustrated in FIG. 6, in a case where both the wires WR1 and WR2 are disconnected, DV1=DV2=DV3=DV4=0 is satisfied, and thereby, $|DV1|=|DV2|=|DV3|=|DV4|$ is satisfied. As such, the failure diagnosis processing of the failure diagnosis circuit 150 can be realized by comparison determination processing in which the failure diagnosis values DV1, DV2, DV3, and DV4 are used.

The determination processing of $|DV1|\approx|DV2|$ can be realized by determining whether or not a difference value between $|DV1|$ and $|DV2|$ is smaller than a given threshold value. $|DV1|\approx|DV3|$ and $|DV2|\approx|DV3|$ are the same.

In addition, in the present embodiment, the failure diagnosis circuit 150 performs the failure diagnosis during an oscillation activation period of the sensor element 10. More specifically, the failure diagnosis circuit 150 performs the failure diagnosis during the oscillation activation period after a drive of the sensor element 10 is started by the drive circuit 30.

Figure 7:
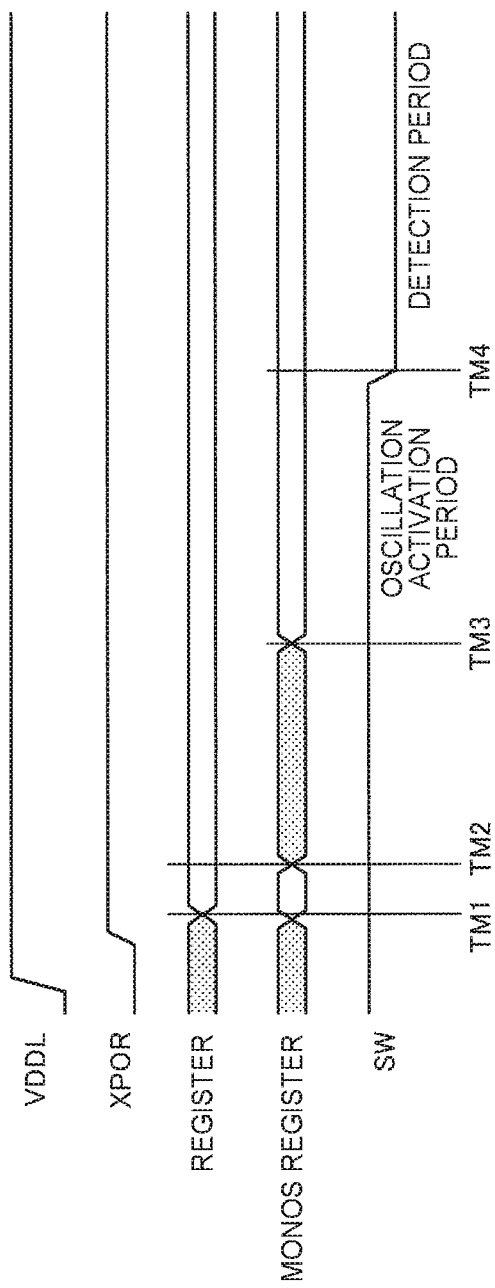
FIG. 7 is a signal waveform diagram illustrating an example of an operation according to the present embodiment.
Figure 8:
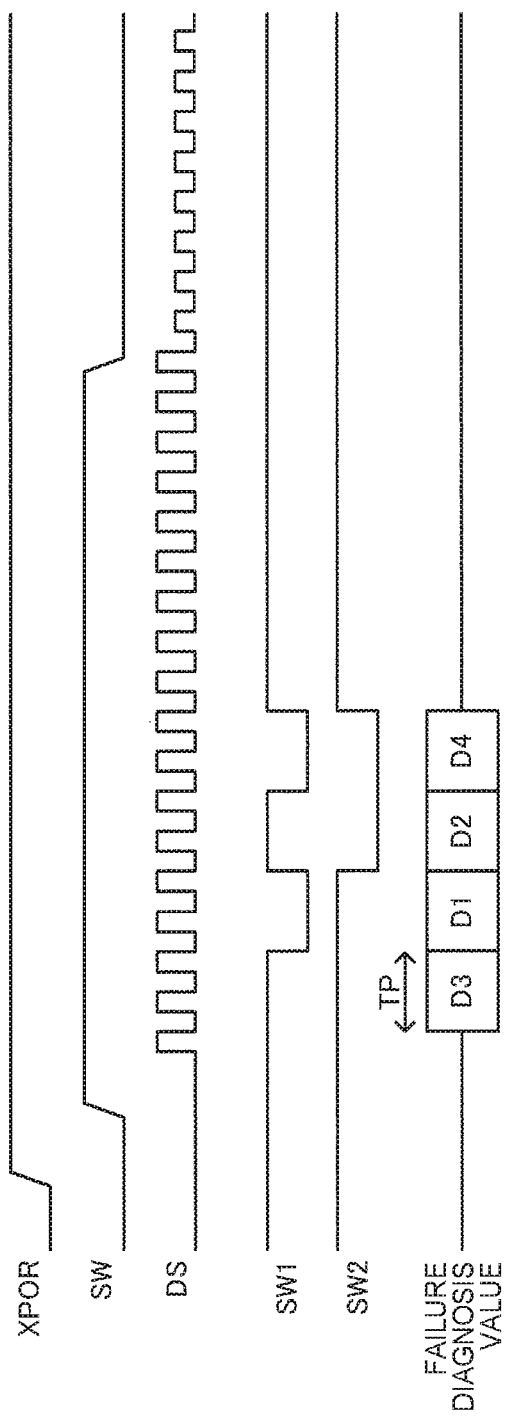
FIG. 8 is a signal waveform diagram illustrating another example of the operation according to the present embodiment.

For example, FIGS. 7 and 8 are signal waveform diagrams illustrating an example of the operation according to the present embodiment. For example, in FIG. 7, if a power supply (VDDL) rises and power-on reset (XPOR) is performed, a memory transfer is performed. The drive circuit 30 starts an operation and outputs the drive signal DS during the oscillation activation period. Thereafter, as illustrated in FIG. 8, the connection states of the switches SW1 and SW2 are changed, and the failure diagnosis is performed. After the failure diagnosis is completed, the detection period is reached, and normal detection processing for the detection signals S1 and S2 is performed.

Specifically, after the power-on reset (XPOR), a register value of the MONOS register 184 of FIG. 2 is set to an initial value, during a period between timings TM1 and TM2 of FIG. 7. During the period between the timings TM2 and TM3, information is transferred (memory transfer) from the nonvolatile memory 170 to the MONOS register 184, and a register value based on the information is set. During the timing TM3, the drive circuit 30 starts an operation and enters an oscillation activation period. During the oscillation activation period, oscillation of the vibrator element of the sensor element 10 starts. A detection period starts at timing TM4, and normal detection processing for detecting a desirable signal from the detection signals S1 and S2 is performed.

In the present embodiment, during the oscillation activation period (TM3 to TM4) of FIG. 7, the failure diagnosis circuit 150 performs the failure diagnosis. For example, in FIG. 7, in a case where SW is in an H level, ON and OFF of the switches SW1 and SW2 are controlled, and the connection states of the switches SW1 and SW2 are changed. Specifically, as illustrated in FIG. 8, ON and OFF of the switches SW1 and SW2 are controlled. In FIG. 8, the H level indicates that the switches SW1 and SW2 are turned on, and the L level indicates that the switches SW1 and SW2 are turned off. In FIG. 8, the connection states of the switches SW1 and SW2 are changed to D3, D1, D2, and D4. That is, first, the connection state D3 in which the switches SW1 and SW2 are both turned on is set. Next, the connection state D1 in which the switch SW1 is turned off and the switch SW2 is turned on is set, and the connection state D2 in which the switch SW1 is turned on and the switch SW2 is turned off is set. Finally, the connection state D4 in which both the switches SW1 and SW2 are turned off is set. In addition, during the periods of the respective connection states D3, D1, D2, and D4, the drive signal DS is changed from one of a voltage level on a low potential side and a voltage level on a high potential side to the other level. In addition, the drive signal is changed from the other level to the one level. By doing so, the failure diagnosis values DV3, DV1, DV2, and DV4 can be acquired in the connection states D3, D1, D2, and D4. By performing comparison determination processing of the acquired failure diagnosis values DV3, DV1, DV2, and DV4, the failure diagnosis described with reference to FIG. 6 and the like can be realized.

In the present embodiment, the failure diagnosis illustrated in FIG. 8 is performed during the oscillation activation period (TM3 to TM4) of the sensor element 10 illustrated in FIG. 7. During the oscillation activation period, even if the switches SW1 and SW2 are turned on or off in the signal paths of the detection signals S1 and S2, detection processing of a desirable signal is not influenced. Accordingly, it is possible to realize both a failure diagnosis in simple configuration and processing of changing the connection states of the switches SW1 and SW2 and detection processing of the desirable signal during the detection period.

In addition, in the present embodiment, for example, the failure diagnosis is performed during the oscillation activation period after a drive of the sensor element 10 is started by the drive circuit 30. Specifically, as illustrated in FIG. 8, during the oscillation activation period, a voltage level of the drive signal DS of the drive circuit 30 is changed, the connection states of the switches SW1 and SW2 are changed, and thereby, the failure diagnosis is performed. By doing so, the signal component of the drive signal DS is transferred via the coupling capacitances CC1 and CC2 and the capacitors CF1 and CF2 of the amplification circuit 61, and the failure diagnosis circuit 150 can acquire the failure diagnosis values as illustrated in FIG. 6. Accordingly, it is possible to detect the failure by effectively using the drive signal DS during the oscillation activation period.

In addition, in the present embodiment, the drive signal DS is changed from one level of an L level (voltage level on a low potential side) and an H level (voltage level on a high potential side) to the other level during the period (TP) of each of the connection states D3, D1, D2, and D4, as illustrated in FIG. 8. In addition, the drive signal is further changed from the other level of the H level and the L level to the one level. By performing the synchronous detection using the synchronous detection circuit 81, during a period (TP) of each connection state, the failure diagnosis value (detection result value) can be acquired in both of a case where the drive signal DS is changed from the L level to the H level and a case where the drive signal DS is changed from the H level to the L level. For example, by changing the drive signal DS a plurality of times (for example, ten times or more) to acquire a plurality of failure diagnosis values during the period of each connection state, the determination accuracy of the failure diagnosis can be increased. For example, by obtaining an average value of the plurality of failure diagnosis values, the determination accuracy of failure diagnosis can be further increased.

In addition, in the present embodiment, it is preferable that the drive circuit 30 outputs the drive signal DS of a rectangular wave. The detection circuit 60 includes the synchronous detection circuit 81 that performs a synchronous detection based on the drive signal DS of a rectangular wave. For example, in FIG. 8, the drive signal DS is a signal of a rectangular wave. As such, if the drive signal DS is a signal of a rectangular wave, during the period (TP) of each of the connection states D3, D1, D2, and D4, the failure diagnosis value is appropriately taken at a rising edge or a falling edge of the drive signal DS of a rectangular wave, as illustrated in FIG. 8. For example, the failure diagnosis value (detection result) at the rising edge or the falling edge of the drive signal DS can be appropriately taken by the synchronous detection of the synchronous detection circuit 81, and thereby, the determination accuracy of the failure diagnosis can be increased.

An amplitude of the drive signal DS is increased during the failure diagnosis period in which the connection states of the switches SW1 and SW2 are changed. For example, the amplitude of the drive signal DS is increased more during the failure diagnosis period than during a period other than the failure diagnosis period, during the oscillation activation period. Here, the amplitude of the drive signal DS corresponds to, for example, the potential difference vds between the voltage level on a high potential side and the voltage level on a low potential side.

As such, if the amplitude of the drive signal DS is increased, vds increases and absolute values of the failure diagnosis values represented by (Cp1/cf)×vds, −(cp2/cf)×vds, and {(cp1−cp2)/cf}×vds also increase. Accordingly, in the failure diagnosis processing, in a case where the comparison determination processing of the failure diagnosis values is performed, the comparison determination processing with a higher accuracy can be performed. For example, in the processing of comparing and determining whether or not |DV1|≈|DV2|>|DV3|>|DV4| described above is satisfied, values of |DV1|, |DV2|, and |DV3| and the like which are the absolute values of the failure diagnosis values are increased, and thereby, it is possible to realize a more accurate comparison determination processing and to increase a determination accuracy of the failure diagnosis.

3. Failure Diagnosis Based on Floor Noise

Figure 9:
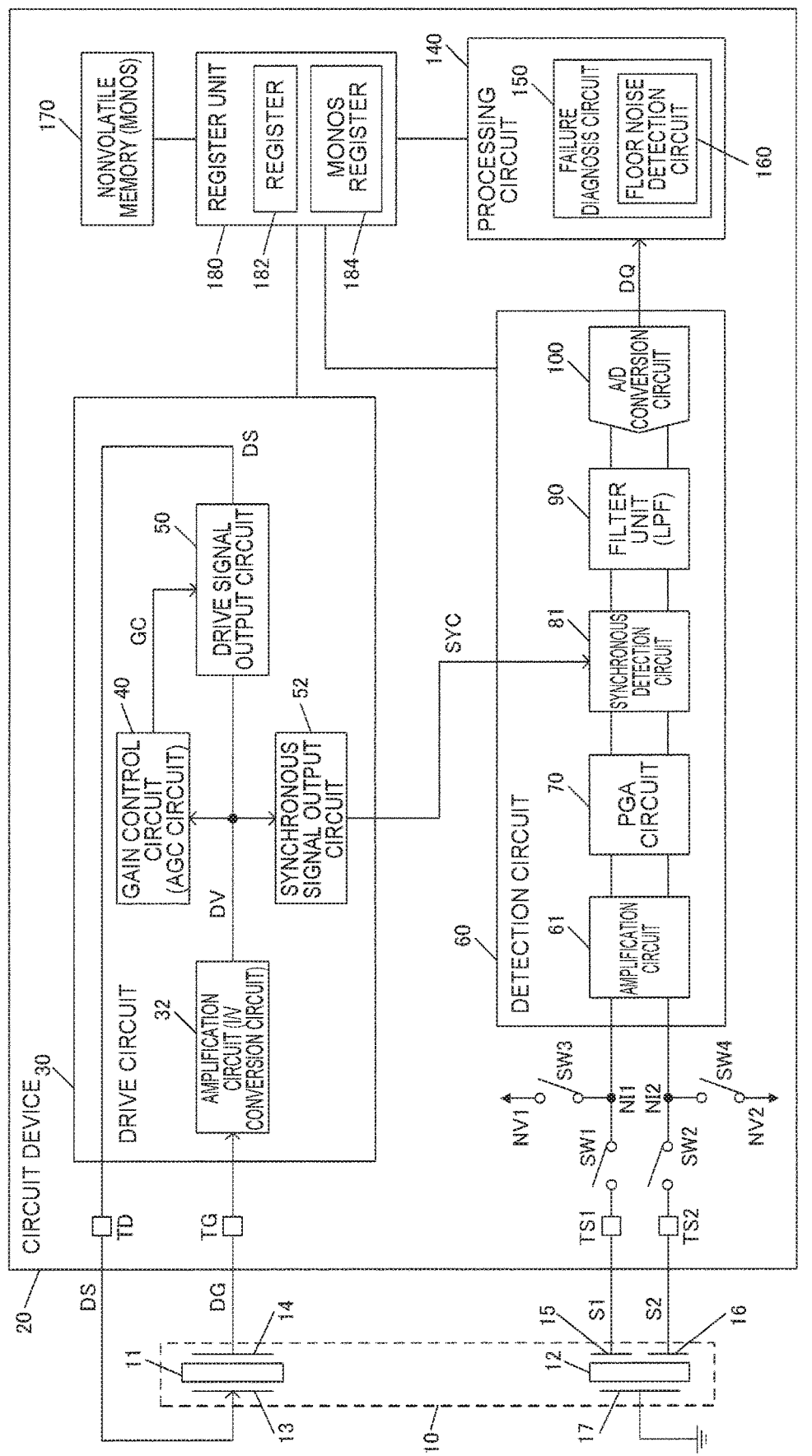
FIG. 9 is a configuration example of the physical quantity measurement device in a case where a failure diagnosis is performed by means of a floor noise detection.

FIG. 9 illustrates a second configuration example of the physical quantity measurement device 5 according to the present embodiment. FIG. 9 is different from FIG. 2 in that a floor noise detection circuit 160 is additionally provided in FIG. 9. For example, in FIG. 9, the failure diagnosis circuit 150 of the processing circuit 140 includes the floor noise detection circuit 160. The failure diagnosis circuit 150 performs a failure diagnosis using the floor noise detection circuit 160. That is, in FIG. 7, the failure diagnosis is performed by changing the connection states of the switches SW1 and SW2 during the oscillation activation period, and the failure diagnosis is performed by performing floor noise detection processing during the detection period. Specifically, the failure diagnosis circuit 150 obtains index information of the floor noise generated by the detection circuit 60, based on the detection result (detection result value, output signal) of the detection circuit 60, and performs the failure diagnosis, based on the obtained index information.

In a case where a failure (abnormality) occurs in the physical quantity measurement device 5, even if the detection result value DQ of the detection circuit 60 is simply monitored, it is difficult to detect the failure. The reason is that, when the detection result value DQ of the detection circuit 60 becomes a predetermined value, it cannot be determined whether there is a change (for example, a rotation of an angular velocity corresponding to the predetermined value in a gyro sensor) in the physical quantity corresponding to the predetermined value or there is a failure.

Therefore, in the present embodiment, during the detection period, the failure diagnosis circuit 150 obtains the index information of the floor noise generated in the detection circuit 60, based on the detection result value DQ which is the detection result of the detection circuit 60, and performs the failure diagnosis, based on the obtained index information.

Here, the floor noise represents the noise generated in the detection circuit 60 and the like, for example, a thermal noise, the 1/f noise, or the like. Specifically, the floor noise is generated in, for example, the amplification circuit 61 or the like. The floor noise can vary depending on a circuit design, a temperature at the time of use, a frequency of a signal, and the like, but has a certain level (amplitude). The reason why the failure diagnosis is possible based on the floor noise will be described below.

Figure 10:
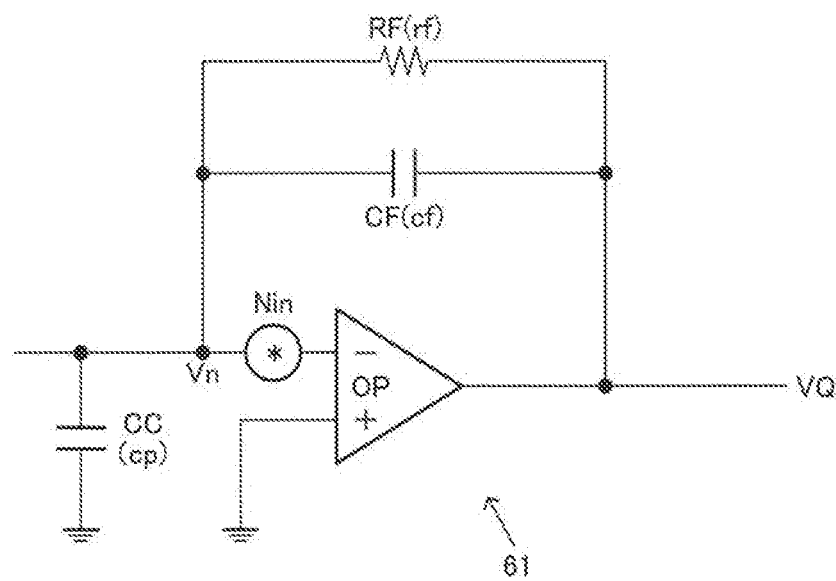
FIG. 10 is an explanatory diagram of the floor noise of an amplification circuit.

FIG. 10 is a diagram illustrating the amplification circuit 61 as a configuration example of a single-ended input and a single-ended output for the sake of simple description. The amplification circuit 61 includes an operational amplifier OP, the capacitor CF for feedback, and the resistor RF for feedback. Here, FIG. 10 illustrates the configuration example of the amplification circuit 61 in a state where the sensor element 10 is connected. However, the switches SW1 and SW2 are omitted. In a state where the sensor element 10 is connected, it looks like that the coupling capacitance CC is connected from the input side of the amplification circuit 61. In the amplification circuit 61, the noise of the entire circuit is assumed to be generated at the input point (Nin of FIG. 10) (input converted noise), and a model in which the input converted noise is amplified by a noise transmission function NTF (noise gain) is widely used. In the example of FIG. 10, the noise transmission function NTF is represented by the following Equation (6). rf is a resistance value of the resistor RF, and cf and cp are capacitance values of the capacitor CF and the coupling capacitance CC.

$$NTF = VQ/Vn = \{1 + s \times rf \times (cf + cp)\}/(1 + s \times rf \times cf) \quad (6)$$

Figure 11:
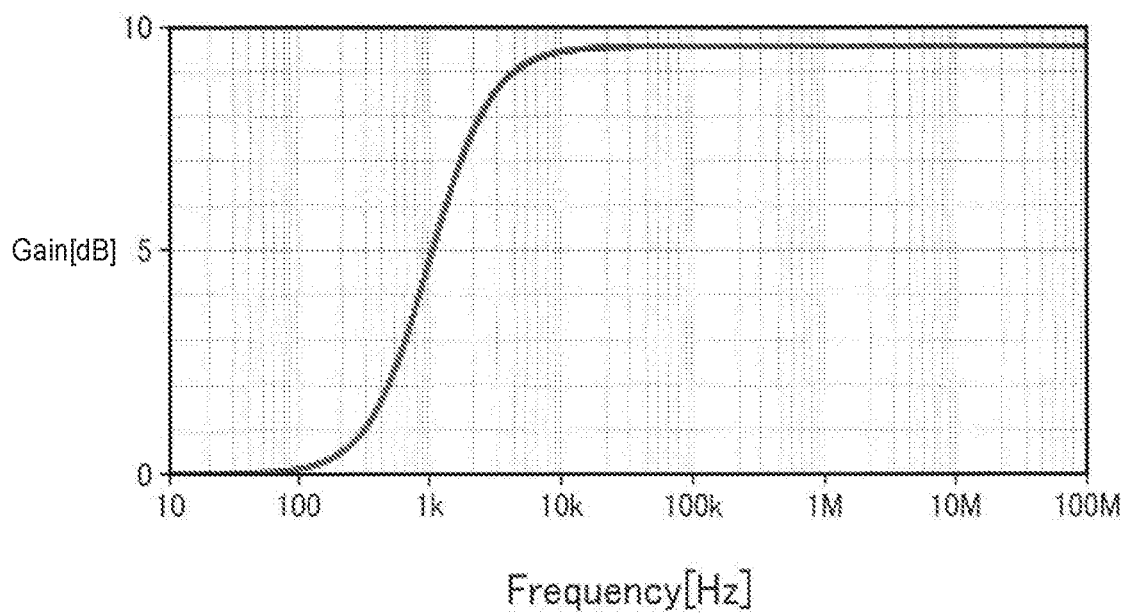
FIG. 11 is a characteristic example of noise gain (noise transmission function).
Figure 12:
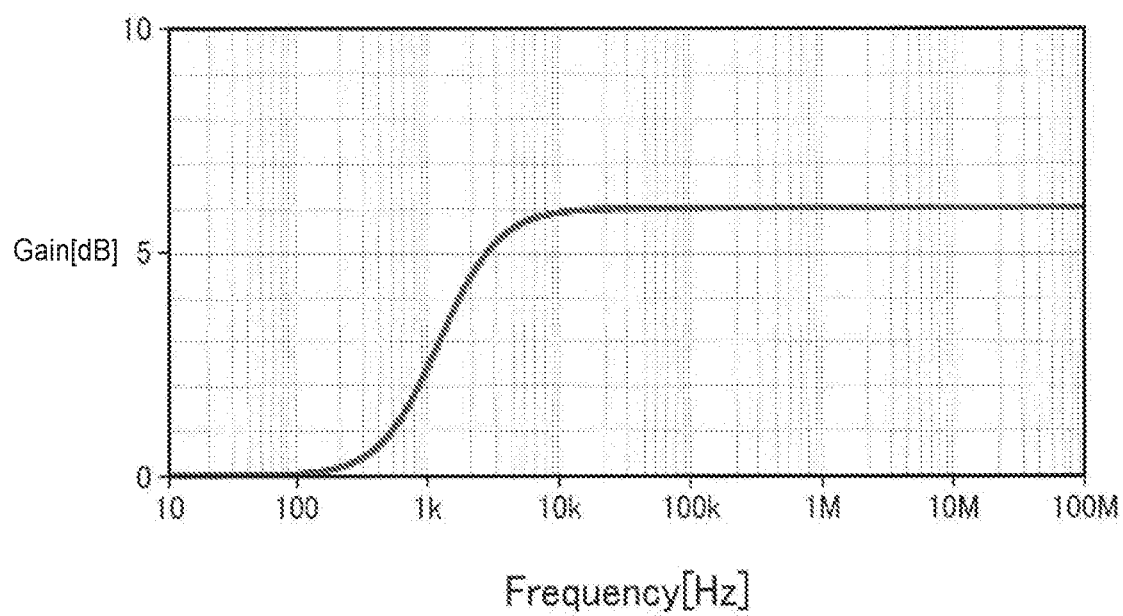
FIG. 12 is another characteristic example of the noise gain (noise transmission function).

FIGS. 11 and 12 are diagrams illustrating frequency characteristics of the noise transmission function NTF represented by Equation (6). In FIGS. 11 and 12, a horizontal axis represents a frequency and a vertical axis represents a gain (amplification factor, unit dB). FIG. 11 is an example of rf=100 MΩ, cf=1 pF, and cp=2 pF. FIG. 12 is an example of rf=100 MΩ, cf=1 pF, and cp=1 pF.

As can be seen from FIGS. 11 and 12, even if the resistance value rf and the capacitance value cf are the same (even for the same amplification circuit 61), if the capacitance value cp of the coupling capacitance CC changes, the noise transmission function NTF changes. That is, even if a level of the input-converted noise of the amplification circuit 61 is approximately the same level, if the capacitance value cp changes, the floor noise of the amplification circuit 61 (floor noise of the detection circuit 60) changes.

Here, it is considered that, if the sensor element 10 and the detection circuit 60 are normally connected, the capacitance value cp of the coupling capacitance CC viewed from the detection circuit 60 is sufficiently close to the predetermined value determined by the design. Meanwhile, in contrast to this, in a case where a connection abnormality such as disconnection of the wire connecting the sensor element 10 to the detection circuit 60 (circuit device 20) occurs, the capacitance value cp of the coupling capacitance CC is not viewed from the detection circuit 60. The connection abnormality is caused by narrowing (wire is peeled) a bonding area of a bonding portion, for example, in a case where the detection electrodes 15 and 16 and the terminals TS1 and TS2 (pads) of the detection circuit 60 are electrically connected to each other by the wires WR1 and WR2 or the like.

It is not assumed that a level of the floor noise becomes a constant level and becomes extremely smaller than the level. However, at the time of failure, the capacitance value cp is not viewed, and thereby, the level of the floor noise becomes small enough to be distinguished compared to the level of the floor noise in the normal state. Accordingly, in the present embodiment, an index value of the floor noise is obtained, and the level of the floor noise is determined by using the index value. In a case where the level of the floor noise is smaller than a level in the normal state, the failure diagnosis circuit 150 determines that the failure (abnormality) occurs.

As described above, the failure diagnosis circuit 150 performs the failure diagnosis, based on the index information of the floor noise. By using the index information of the floor noise in this way, the failure can be appropriately detected. In the present embodiment, the detection result value DQ of the detection circuit 60 is monitored, the index information of the floor noise is obtained from the detection result value DQ, and thereby, it is possible to detect the failure even during the detection period in which a desirable signal is detected, and to realize the failure diagnosis all the time.

Figure 13:
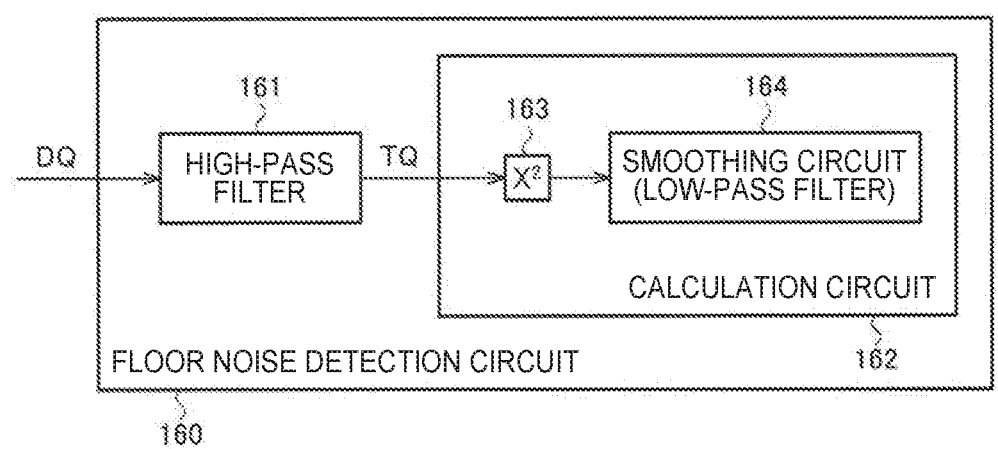
FIG. 13 is a configuration example of a floor noise detection circuit.

FIG. 13 illustrates a configuration example of the floor noise detection circuit 160 included in the failure diagnosis circuit 150. The floor noise detection circuit 160 includes a high-pass filter 161 and a calculation circuit 162. The calculation circuit 162 includes a square calculation processing unit 163 and a smoothing circuit 164 that smooths an output of the square calculation processing unit 163.

The high-pass filter 161 performs filter processing (high-pass filter processing) on the detection result value DQ from the detection circuit 60 to remove DC components. The square calculation processing unit 163 performs a square calculation of a value TQ whose DC components were removed. The smoothing circuit 164 smooths the value squared by the square calculation processing unit 163 and obtains a root mean square thereof. The noise components are extracted by the root mean square. The smoothing circuit 164 can be realized by, for example, a low pass filter. The smoothing circuit 164 outputs an effective value (floor noise dispersion) of the floor noise.

By using the floor noise detection circuit 160, the index information (dispersion, absolute value average, and the like) representing the level of the floor noise is obtained. The failure diagnosis circuit 150 compares an index value which is the index information of floor noise with a threshold value, and performs the failure detection. Here, the threshold value can distinguish between the index value of the floor noise in the normal state and the index value of the floor noise in the failure state (abnormal state). In the example in which the index value increases as the noise level of the floor noise increases, the failure diagnosis circuit 150 determines that an abnormality occurs in a case where the index value represented by the index information is smaller than the threshold value.

4. Sensor Element

FIG. 14 illustrates an example of the configuration of the sensor element 10. FIG. 14 illustrates an example of a double T-shaped gyro sensor element.

The sensor element 10 includes the drive arms 18A, 18B, 18C, and 18D, the detection arms 19A and 19B, a base portion 21, and connection arms 22A and 22B. The detection arms 19A and 19B extend in the +Y-axis direction and the −Y-axis direction with respect to the rectangular base portion 21. In addition, the connection arms 22A and 22B extend in the +X-axis direction and the −X-axis direction with respect to the base portion 21. The drive arms 18A and 18B extend from the tip portion thereof in the +Y-axis direction and the −Y-axis direction with respect to the connection arm 22A, and the drive arms 18C and 18D extend from the tip portion thereof in the +Y-axis direction and the −Y-axis direction with respect to the connection arm 22B. A hammer head portion provided on the tip sides of the drive arms 18A, 18B, 18C, and 18D and the detection arms 19A and 19B is used as, for example, a frequency adjustment weight. If the Z axis is set in the thickness direction of the sensor element 10, the sensor element 10 which is a gyro sensor element detects an angular velocity around the Z axis. The X axis and the Y axis are coordinate axes orthogonal to the Z axis, and the X axis and the Y axis are orthogonal to each other. A vibrator element of the sensor element 10 can be formed of a piezoelectric material such as quartz crystal, lithium tantalate or lithium niobate. It is preferable to use the quartz crystal as a configuration material of the vibrator element, among the materials. The X axis, the Y axis, and the Z axis are also referred to as an electric axis, a mechanical axis, and an optical axis of a quartz crystal substrate, respectively. The quartz crystal substrate is configured by a plate-like Z-cut crystal plate or the like having a thickness in the Z-axis direction.

The drive electrodes 13 are formed on the upper and lower surfaces of the drive arms 18A and 18B, and the drive electrodes 14 are formed on the right surface and the left surface of the drive arms 18A and 18B. The drive electrodes 14 are formed on the upper and lower surfaces of the drive arms 18C and 18D, and the drive electrodes 13 are formed on the right surface and the left surface of the drive arms 18C and 18D. The drive signal DS from the drive circuit 30 is supplied to the drive electrode 13, and the feedback signal DG from the drive electrode 14 is input to the drive circuit 30.

The detection electrodes 15 are formed on the upper and lower surfaces of the detection arm 19A, and the ground electrodes 17 are formed on the right surface and the left surface of the detection arm 19A. The detection electrodes 16 are formed on the upper and lower surfaces of the detection arm 19B, and the ground electrodes 17 are formed on the right surface and the left surface of the detection arm 19B. The detection signals S1 and S2 from the detection electrodes 15 and 16 are input to the detection circuit 60.

Grooves (not illustrated) for improving an electric field effect between the electrodes are provided on the upper and lower surfaces of the drive arms 18A, 18B, 18C, and 18D and the detection arms 19A and 19B. By providing the grooves, a comparatively large electric charge amount can be generated with a relatively small amount of distortion. In addition, the upper surface is on the +Z-axis direction side (a positive direction side of the Z axis), and the lower surface is on the −Z-axis direction side (a negative direction side of the Z axis). The right surface is on the +X-axis direction side (a positive direction side of the X axis), and the left surface is on the −X-axis direction side (a negative direction side of the X axis).

The drive terminals 23 and 24 and the detection terminals 25 and 26 are provided on the base portion 21. The ground electrodes 17 are formed between these terminals. The drive signal DS from the drive circuit 30 is input to the drive terminal 23, and the feedback signal DG to the drive circuit 30 is output from the drive terminal 24. The detection signal S1 to the detection circuit 60 is output from the detection terminal 25, and the detection signal S2 to the detection circuit 60 is output from the detection terminal 26.

For example, first and second electrode leads (not illustrated) are connected to the drive terminals 23 and 24. The drive signal DS is supplied from the drive circuit 30 via the first electrode lead, and the feedback signal DG is output to the drive circuit 30 via the second electrode lead. In addition, third and fourth electrode leads (not illustrated) are connected to the detection terminals 25 and 26. The detection signals S1 and S2 are output to the detection circuit 60 via the third and fourth electrode leads.

The drive electrodes of the sensor element 10 illustrated in FIG. 14 include the drive electrodes 13 and 14 provided in the drive arms 18A to 18D and the drive wires connected thereto. The drive wires include the drive electrodes 13 and 14 formed (disposed) on the connection arms 22A and 22B, the drive terminals 23 and 24 formed (disposed) on the base portion 21, and the drive electrodes 13 and 14 formed (disposed) in the connection portions with the connection arms of the drive arms 18A to 18D. The present embodiment is not limited to the examples of the drive electrodes 13 and 14 and the drive terminals 23 and illustrated in FIG. 14. In addition, the detection electrodes of the sensor element 10 in FIG. 14 include the detection electrodes 15 and 16 provided on the detection arms 19A and 19B, and the detection wires connected thereto. The detection wires include the detection terminals 25 and formed (disposed) on the base portion 21, and the detection electrodes 15 and 16 formed (disposed) in the connection portions with the base portion 21 of the detection arms 19A and 19B. The present embodiment is not limited to the examples of the detection electrodes 15 and 16 and the detection terminals 25 and 26 illustrated in FIG. 14. In a case of the sensor element 10 of FIG. 14, it is considered that coupling capacitances generated between the drive terminal 23 formed on the base portion 21 and the detection terminals 25 and 26 contribute to the coupling capacitances CC1 and CC2 described with reference to FIG. 4.

Figure 15:
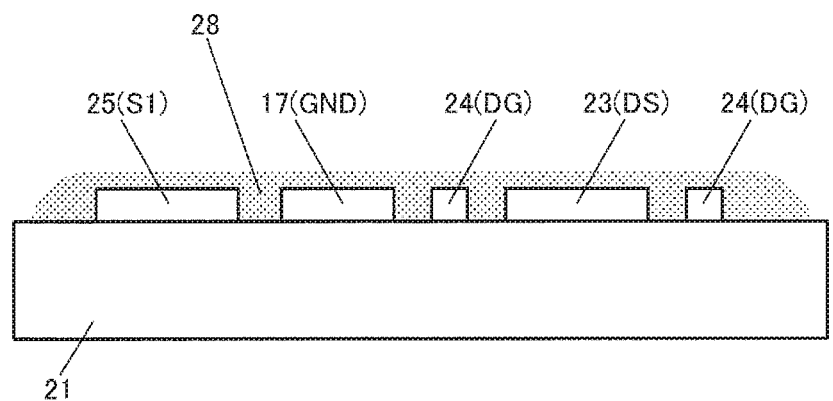
FIG. 15 is an explanatory diagram of a method of providing a dielectric that covers a drive terminal and a detection terminal.

FIG. 15 is a sectional view taken along line E-E' in FIG. 14. The drive terminals 23 and 24 and the detection terminal 25 (detection terminal 26) are formed in the base portion 21. In addition, the ground electrodes 17 are also formed. The dielectric 28 is formed so as to cover the drive terminals 23 and 24, the detection terminal 25, and the like. For example, the dielectric 28 (insulator) which is an insulating material is formed.

As such, in the present embodiment, the sensor element 10 includes the base portion 21, the drive arms 18A, 18B, 18C, and 18C, and the detection arms 19A and 19B. The drive terminals 23 and 24 and the detection terminals 25 and 26 are provided on the base portion 21, and the dielectric 28 is provided so as to cover the drive terminals 23 and 24 of the base portion 21 and the detection terminals 25 and 26. For example, the dielectric 28 is formed by applying an insulating material such as polyimide. By doing so, it is possible to increase capacitance values of the coupling capacitances CC1 and CC2 described with reference to FIG. 4 by the dielectric constant ca of the insulating material, as compared with a case where the insulating material is not applied. The coupling capacitances CC1 and CC2 may be adjusted to desirable capacitance values by adjusting the amount of insulator between the electrodes by using a trimming technique.

For example, the electrostatic leakage components are based on the coupling capacitances uniquely determined from structures of the drive electrode and the detection electrode, but the capacitance values of the coupling capacitances can be increased by coating a surface (a front surface of the base portion 21) of the sensor element 10 with an insulating material such as polyimide. Thereby, it is possible to increase the electrostatic leakage components. Accordingly, the failure diagnosis value based on the electrostatic leakage components also becomes a large value, and the failure diagnosis with a high determination accuracy can be realized. The sensor element 10 can have a structure supported on the circuit device 20 in a package of the physical quantity measurement device 5 by using electrode leads connected to the drive terminals 23 and 24 and the detection terminals 25 and 26 as a support portion. In this case, openings are formed in the drive terminals 23 and 24 and the detection terminals 25 and 26, and one end of the electrode lead is connected. For example, the electrode leads may be connected by using conductive bumps such as metal bumps.

Figure 16:
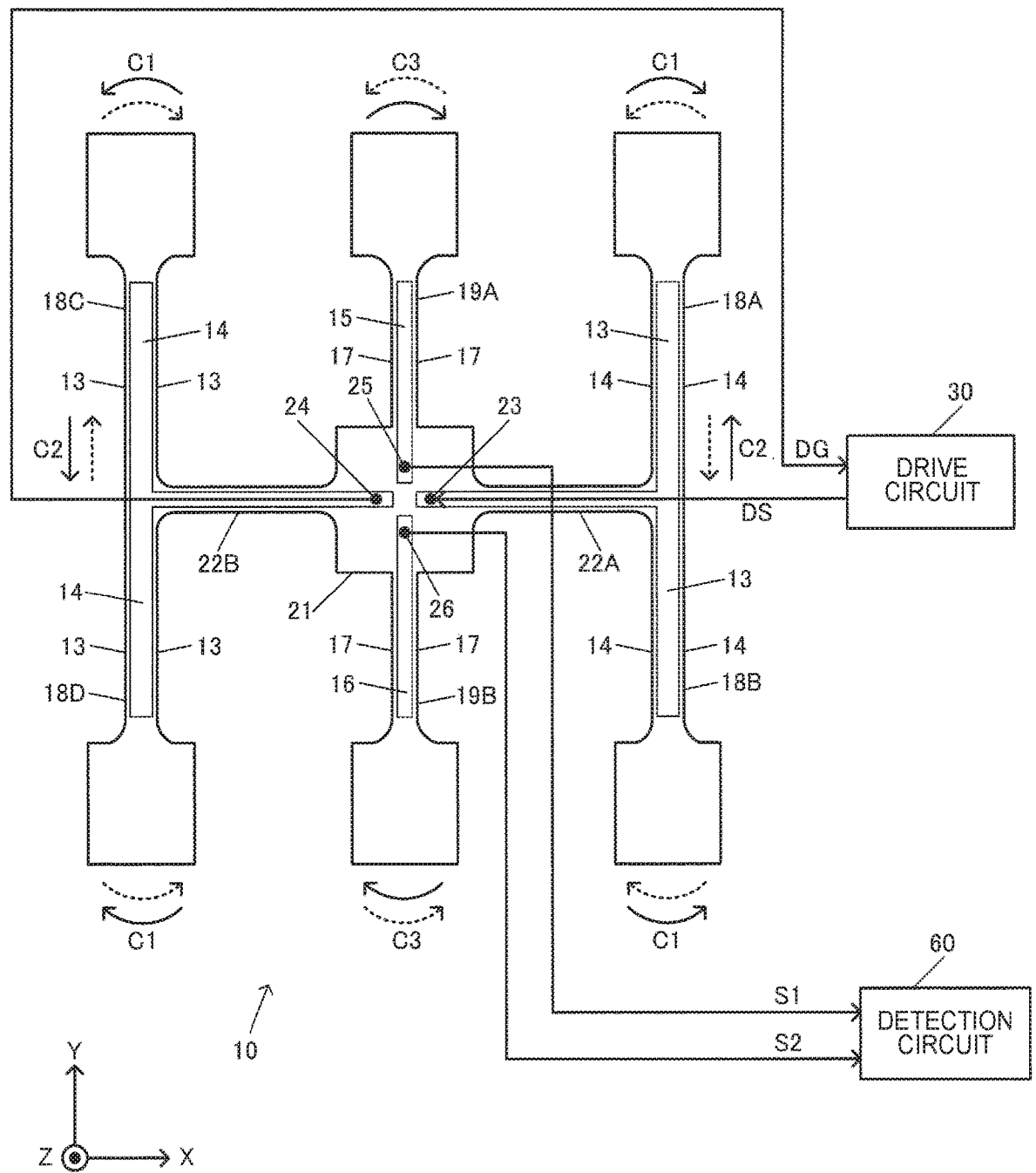
FIG. 16 is an explanatory diagram of an operation of a sensor element.

FIG. 16 is a diagram schematically illustrating the operation of the sensor element 10. An angular velocity around the Z axis is detected by the sensor element 10 which is an angular velocity sensor.

If the drive signal DS is applied to the drive electrode 13 by the drive circuit 30, the drive arms 18A, 18B, 18C, and 18D perform flexural vibration (excitation vibration) as indicated by an arrow C1 in FIG. 16 due to an inverse piezoelectric effect. For example, a vibration mode indicated by a solid line arrow and a vibration mode indicated by a dotted line arrow are repeated at a predetermined frequency. That is, the flexural vibration is performed in which tips of the drive arms 18A and 18C repeat approaching and separating from each other, and tips of the drive arms 18B and 18D also repeat approaching and separating from each other. At this time, since the drive arms 18A and 18B and the drive arms 18C and 18D vibrate in a line symmetrical manner with respect to the X axis passing through the center of gravity location of the base portion 21, the base portion 21, the connection arms 22A and 22B, the detection arms 19A and 19B hardly vibrate.

In this state, if an angular velocity in which the Z axis is used as a rotation axis is applied to the sensor element 10 (if the sensor element 10 rotates around the Z axis), the drive arms 18A, 18B, 18C, and 18D vibrate as indicated by an arrow C2 by the Coriolis force. That is, the Coriolis force in a direction of the arrow C2 orthogonal to a direction of the arrow C1 and the Z-axis direction acts on the drive arms 18A, 18B, 18C, and 18D, and thereby, the vibration component in the direction of the arrow C2 is generated. The vibration of the arrow C2 is transmitted to the base portion 21 via the connection arms 22A and 22B, and thereby, the detection arms 19A and 19B perform the flexural vibration in the direction of the arrow C3. Electric charge signals generated by a piezoelectric effect due to the flexural vibration of the detection arms 19A and 19B are input to the detection circuit 60 as the detection signals S1 and S2, and the angular velocity around the Z axis is detected.

For example, if the angular velocity of the sensor element 10 around the Z axis is referred to as $\omega$, a mass is referred to as m, and the vibration speed is referred to as v, the Coriolis force is represented as $Fc = 2m \cdot v \cdot \omega$. Accordingly, by detecting a desirable signal which is a signal corresponding to the Coriolis force, the detection circuit 60 can obtain the angular velocity $\omega$ around the Z axis.

5. Vehicle and Electronic Apparatus

Figure 17:
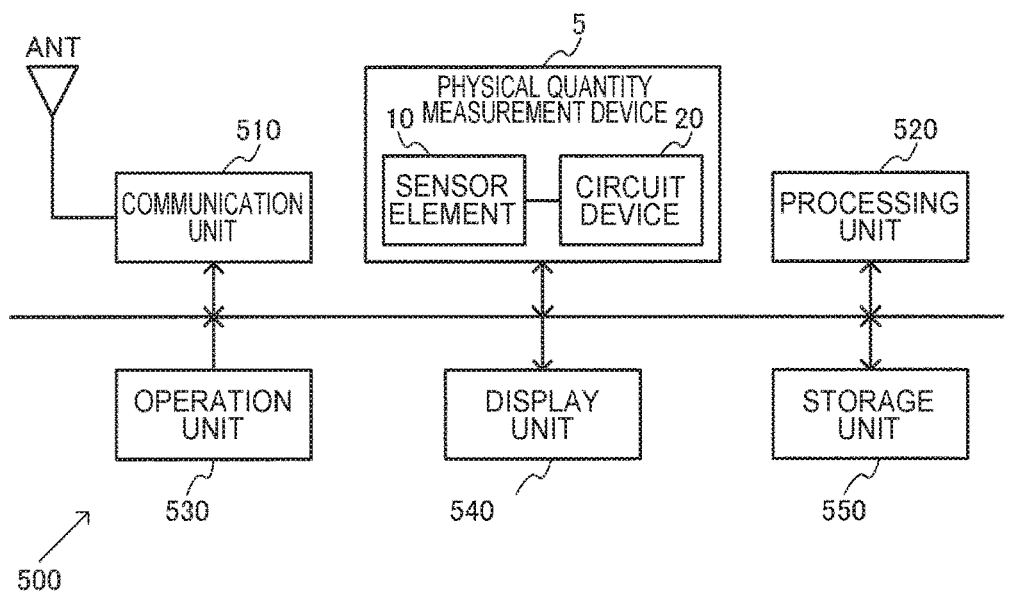
FIG. 17 is a configuration example of an electronic apparatus.

FIG. 17 illustrates a configuration example of an electronic apparatus 500 including the physical quantity measurement device 5 according to the present embodiment. The electronic apparatus 500 includes the physical quantity measurement device 5 including the sensor element 10 and the circuit device 20, and a processing unit 520. In addition, the electronic apparatus 500 can include a communication unit 510, an operation unit 530, a display unit 540, a storage unit 550, and an antenna ANT.

The communication unit 510 (wireless circuit) receives data from the outside via the antenna ANT, and performs processing of transmitting the data to the outside. The processing unit 520 (processing circuit) performs control processing of the electronic apparatus 500, signal processing of physical quantity information measured by the physical quantity measurement device 5, signal processing of data transmitted and received via the communication unit 510, and the like. A function of the processing unit 520 can be realized by a processor such as a microcomputer. The operation unit 530 is for the user to perform an input operation, and can be realized by an operation button, a touch panel display, or the like. The display unit 540 displays various types of information and can be realized by a display such as liquid crystal or organic EL. The storage unit 550 stores data, and a function thereof can be realized by a semiconductor memory such as a RAM or a ROM, a hard disk drive (HDD), or the like.

The physical quantity measurement device 5 according to the present embodiment can be applied to various electronic apparatuses, such as a camera such as a digital still camera or a video camera, an in-vehicle apparatus, a wearable apparatus, a robot, and the like. For example, a camera shake correction or the like can be performed in the camera by using the physical quantity measurement device 5. The in-vehicle apparatus is an electronic apparatus mounted on an automobile, a motorcycle, or the like, and is, for example, an automatic drive apparatus, a navigation apparatus, or an in-vehicle communication apparatus. The wearable apparatus is an apparatus that a user wears on the body, for example, a wrist type wearable apparatus, a head mounting type display device, a pulse rate meter, a pedometer, an activity meter, or the like. For example, the wearable apparatus can detect a body motion of the user or detect a motion state by using the physical quantity measurement device 5. In addition, the physical quantity measurement device 5 can also be applied to a movable portion (arm, joint) or a main body portion of a robot. The robot can also be assumed to be any of a vehicle (running and walking robot) and an electronic apparatus (non-running and non-walking robot). In a case of the running and walking robot, the physical quantity measurement device 5 according to the present embodiment can be used for, for example, an autonomous travel. In addition, the physical quantity measurement device 5 according to the present embodiment can be applied to various electronic apparatuses, such as a portable information terminal (smartphone or the like), a print device, a projection device, a measurement apparatus for measuring a physical quantity, and the like.

Figure 18:
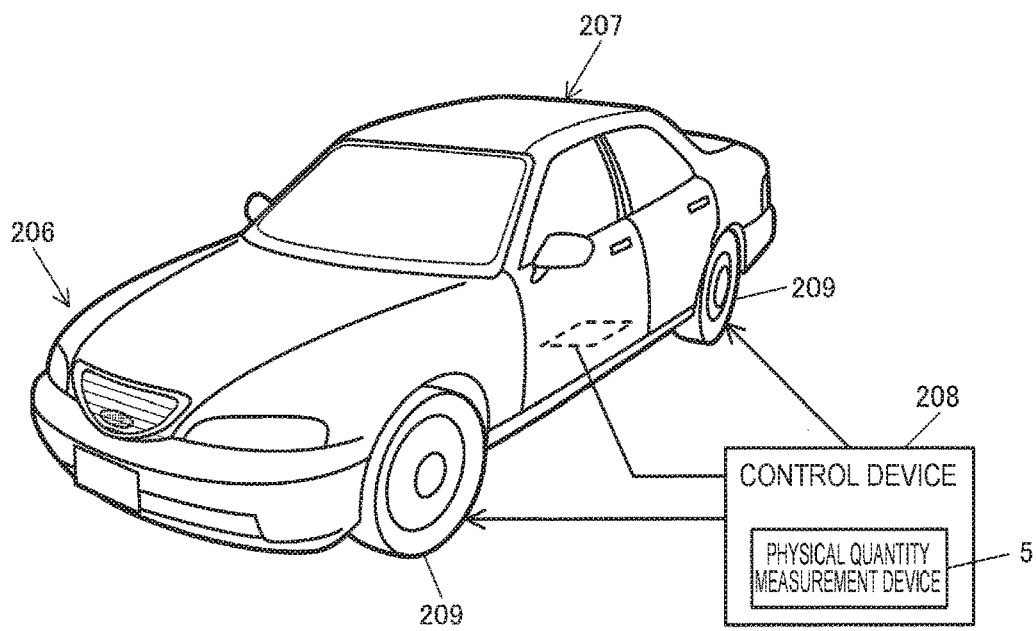
FIG. 18 is a configuration example of a vehicle.

FIG. 18 illustrates an example of a vehicle including the physical quantity measurement device 5 according to the present embodiment. The physical quantity measurement device 5 according to the present embodiment can be incorporated into various vehicles, such as a car, an airplane, a motorbike, a bicycle, a ship, and the like. The vehicle is an apparatus or device that includes a drive mechanism such as an engine and a motor, a steering mechanism such as a steering wheel or a rudder, and various types of electronic apparatuses and moves on the ground, the sky, or the sea. FIG. 18 schematically illustrates an automobile 206 as a specific example of the vehicle. The physical quantity measurement device 5 including the sensor element 10 and the circuit device 20 is incorporated into the automobile 206. The physical quantity measurement device 5 can detect a posture of a vehicle body 207. The physical quantity information such as an angular velocity measured by the physical quantity measurement device 5 is supplied to a control device 208 that performs a vehicle body posture control and the like. For example, the control device 208 can control hardness of a suspension depending on the posture of the vehicle body 207 or can control a brake of each of the wheels 209. In addition to this, the posture control can be used in various vehicles, such as a bipedal walking robot, an aircraft, a helicopter, and the like. The physical quantity measurement device 5 can also be applied to realize the posture control.

Although the present embodiment is described in detail as above, it will be readily understood by those skilled in the art that various modifications can be made without practically departing from the novel matters and effects of the invention. Accordingly, all the modification examples are included in the scope of the invention. For example, in the specification or the drawings, a term that is described at least once together with a different term which is broader or equivalent can be replaced with the different term at any point in the specification or the drawings. In addition, configurations or the like of a physical quantity measurement device, a circuit device, a sensor element, an electronic apparatus, and a vehicle are not also limited to those described in the present embodiment, and various modifications can be made.

What is claimed is:

1. A physical quantity measurement device comprising:
a sensor element that includes a drive electrode, a first detection electrode, and a second detection electrode, and in which coupling capacitances are formed between the drive electrode and the first detection electrode and between the drive electrode and the second detection electrode; and
a circuit device that includes a drive circuit which supplies a drive signal to the drive electrode, a detection circuit which detects physical quantity information corresponding to a physical quantity, based on a first detection signal from the first detection electrode and a second detection signal from the second detection electrode, and a failure diagnosis circuit,
wherein the circuit device includes
a first switch that is provided between a first terminal to which the first detection signal is input and the detection circuit, and
a second switch that is provided between a second terminal to which the second detection signal is input and the detection circuit,
wherein the failure diagnosis circuit performs a failure diagnosis based on a detection result of the detection circuit when connection states of the first and second switches are changed,
wherein the connection states include a first connection state in which the first switch is turned off and the second switch is turned on, and a second connection state in which the first switch is turned on and the second switch is turned off, and
wherein the failure diagnosis circuit performs the failure diagnosis based on a first failure diagnosis value which is a detection result value of the detection circuit when the first and second switches are in the first connection state, and a second failure diagnosis value which is a detection result value of the detection circuit when the first and second switches are in the second connection state.

2. The physical quantity measurement device according to claim 1,
wherein the connection states include a third connection state in which the first and second switches are turned on, and
wherein the failure diagnosis circuit performs the failure diagnosis based on the first and second failure diagnosis values and a third failure diagnosis value which is a detection result value of the detection circuit when the first and second switches are in the third connection state.

3. The physical quantity measurement device according to claim 2,
wherein the failure diagnosis circuit performs the failure diagnosis through comparison determination processing of the first, second, and third failure diagnosis values.

4. The physical quantity measurement device according claim 1,
wherein the drive signal supplied by the drive circuit is output from the drive circuit as a rectangular wave, and
wherein the detection circuit includes a synchronous detection circuit that performs a synchronous detection based on the drive signal.

5. The physical quantity measurement device according to claim 1, further comprising:
a third switch that is provided between one end of the first switch connected to the first terminal and a node of an analog ground, and is turned on when the first switch is turned off; and
a fourth switch that is provided between one end of the second switch connected to the second terminal and the node of the analog ground, and is turned on when the second switch is turned off.

6. The physical quantity measurement device according to claim 1,
wherein the detection circuit includes an amplification circuit that includes a first capacitor which is provided between a first output terminal and a first input terminal and a second capacitor which is provided between a second output terminal and a second input terminal, and performs a differential amplification of the first and second detection signals,
wherein the first switch is provided between the first input terminal of the amplification circuit and the first terminal of the circuit device, and
wherein the second switch is provided between the second input terminal of the amplification circuit and the second terminal of the circuit device.

7. The physical quantity measurement device according to claim 1,
wherein the failure diagnosis circuit performs the failure diagnosis based on a detection result value of digital data of the detection circuit when the connection states of the first and second switches are changed.

8. The physical quantity measurement device according to claim 1,
wherein the failure diagnosis circuit performs the failure diagnosis during an oscillation activation period of the sensor element.

9. The physical quantity measurement device according to claim 8,
wherein the failure diagnosis circuit performs the failure diagnosis during the oscillation activation period after a drive of the sensor element is started by the drive circuit.

10. The physical quantity measurement device according to claim 1,
wherein the failure diagnosis circuit obtains index information of a floor noise that is generated in the detection circuit, based on a detection result of the detection circuit, and performs the failure diagnosis based on the index information, during a detection period of the detection circuit.

11. An electronic apparatus comprising:
a physical quantity measurement device including:
a sensor element that includes a drive electrode, a first detection electrode, and a second detection electrode, and in which coupling capacitances are formed between the drive electrode and the first detection electrode and between the drive electrode and the second detection electrode; and
a circuit device that includes a drive circuit which supplies a drive signal to the drive electrode, a detection circuit which detects physical quantity information corresponding to a physical quantity, based on a first detection signal from the first detection electrode and a second detection signal from the second detection electrode, and a failure diagnosis circuit, wherein the circuit device includes
- a first switch that is provided between a first terminal to which the first detection signal is input and the detection circuit, and
- a second switch that is provided between a second terminal to which the second detection signal is input and the detection circuit, wherein the failure diagnosis circuit performs a failure diagnosis based on a detection result of the detection circuit when connection states of the first and second switches are changed, wherein the connection states include a first connection state in which the first switch is turned off and the second switch is turned on, and a second connection state in which the first switch is turned on and the second switch is turned off, and wherein the failure diagnosis circuit performs the failure diagnosis based on a first failure diagnosis value which is a detection result value of the detection circuit when the first and second switches are in the first connection state, and a second failure diagnosis value which is a detection result value of the detection circuit when the first and second switches are in the second connection state; and a processor configured to perform signal processing of the physical quantity information measured by the physical quantity measurement device.

12. The electronic apparatus according to claim 11,
wherein the connection states include a third connection state in which the first and second switches are turned on, and
wherein the failure diagnosis circuit performs the failure diagnosis based on the first and second failure diagnosis values and a third failure diagnosis value which is a detection result value of the detection circuit when the first and second switches are in the third connection state.

13. The electronic apparatus according to claim 12,
wherein the failure diagnosis circuit performs the failure diagnosis through comparison determination processing of the first, second, and third failure diagnosis values.

14. The electronic apparatus according to claim 11,
wherein the drive signal supplied by the drive circuit is output from the drive circuit as a rectangular wave, and
wherein the detection circuit includes a synchronous detection circuit that performs a synchronous detection based on the drive signal.

15. A vehicle comprising:
a body;
a drive mechanism configured to propel the body; and
a physical quantity measurement device coupled to the body, the physical quantity measurement device including:

a sensor element that includes a drive electrode, a first detection electrode, and a second detection electrode, and in which coupling capacitances are formed between the drive electrode and the first detection electrode and between the drive electrode and the second detection electrode; and a circuit device that includes a drive circuit which supplies a drive signal to the drive electrode, a detection circuit which detects physical quantity information corresponding to a physical quantity, based on a first detection signal from the first detection electrode and a second detection signal from the second detection electrode, and a failure diagnosis circuit, wherein the circuit device includes
- a first switch that is provided between a first terminal to which the first detection signal is input and the detection circuit, and
- a second switch that is provided between a second terminal to which the second detection signal is input and the detection circuit, wherein the failure diagnosis circuit performs a failure diagnosis based on a detection result of the detection circuit when connection states of the first and second switches are changed, wherein the connection states include a first connection state in which the first switch is turned off and the second switch is turned on, and a second connection state in which the first switch is turned on and the second switch is turned off, and wherein the failure diagnosis circuit performs the failure diagnosis based on a first failure diagnosis value which is a detection result value of the detection circuit when the first and second switches are in the first connection state, and a second failure diagnosis value which is a detection result value of the detection circuit when the first and second switches are in the second connection state.

16. The vehicle according to claim 15,
wherein the connection states include a third connection state in which the first and second switches are turned on, and
wherein the failure diagnosis circuit performs the failure diagnosis based on the first and second failure diagnosis values and a third failure diagnosis value which is a detection result value of the detection circuit when the first and second switches are in the third connection state.

17. The vehicle according to claim 16,
wherein the failure diagnosis circuit performs the failure diagnosis through comparison determination processing of the first, second, and third failure diagnosis values.

* * * * *